(12) United States Patent
Hodge

(10) Patent No.: US 12,145,070 B2
(45) Date of Patent: *Nov. 19, 2024

(54) VIDEO GAME CENTER FOR A CONTROLLED ENVIRONMENT FACILITY

(71) Applicant: **Global Tel*Link Corporation**, Reston, VA (US)

(72) Inventor: Stephen Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,521

(22) Filed: Jan. 3, 2022

(65) Prior Publication Data

US 2022/0184501 A1    Jun. 16, 2022

Related U.S. Application Data

(63) Continuation of application No. 15/674,344, filed on Aug. 10, 2017, now Pat. No. 11,213,754.

(51) Int. Cl.
*A63F 13/73* (2014.01)
*A63F 13/32* (2014.01)
(Continued)

(52) U.S. Cl.
CPC .............. *A63F 13/73* (2014.09); *A63F 13/32* (2014.09); *A63F 13/335* (2014.09); *A63F 13/35* (2014.09); *A63F 13/79* (2014.09); *A63F 13/87* (2014.09)

(58) Field of Classification Search
CPC .. A63F 9/24; A63F 13/32; A63F 13/35; A63F 13/73; A63F 13/335; A63F 13/79;
(Continued)

(56) References Cited

U.S. PATENT DOCUMENTS 5,757,417 A    5/1998  Aras et al.
5,796,948 A    8/1998  Cohen
(Continued)

FOREIGN PATENT DOCUMENTS

WO    WO 2013/096944 A1    6/2013

OTHER PUBLICATIONS

Copyright Registration Record for "iPhone: The Missing Manual," 6th ed., 2012; 1 page.
(Continued)

*Primary Examiner* — Patrick Mcatee
*Assistant Examiner* — Nakia Leffall-Allen
(74) *Attorney, Agent, or Firm* — Sterne, Kessler, Goldstein & Fox P.L.L.C.

(57) ABSTRACT

In the present disclosure, systems and methods are described for video gaming in a controlled environment facility. A video game server allows tenants of a controlled environment facility to play video games that are served and monitored by the video game server. In embodiments, users may initiate a game session to play games in a single player mode, competitive multiplayer or cooperative multiplayer mode depending on the game being played. The video game server maintains block lists for each user such that those users may not initiate or engage in the same game sessions with each other. In game sessions with two or more users, the video game server allows users to communicate via audio or text communications. The video game server may monitor those communications for potential security concerns. Users may also view videos of previously completed or live game sessions, subject to similar security monitoring measures.

20 Claims, 14 Drawing Sheets

(51) Int. Cl.
  *A63F 13/335* (2014.01)
  *A63F 13/35* (2014.01)
  *A63F 13/79* (2014.01)
  *A63F 13/87* (2014.01)
(58) Field of Classification Search
  CPC . A63F 13/87; G06F 3/01; G06F 15/16; G06F 17/00; H04W 4/02
  See application file for complete search history.

(56) References Cited

U.S. PATENT DOCUMENTS

| | | |
|---|---|---|
| 6,330,537 B1 | 12/2001 | Davis et al. |
| 6,684,240 B1 | 1/2004 | Goddard |
| 6,734,900 B2 | 5/2004 | Mayhew |
| 6,740,802 B1 | 5/2004 | Browne, Jr. |
| 6,810,527 B1 | 10/2004 | Conrad et al. |
| 6,829,582 B1 | 12/2004 | Barsness |
| 6,879,828 B2 | 4/2005 | Virtanen et al. |
| 7,027,659 B1 | 4/2006 | Thomas |
| 7,752,274 B2 | 7/2010 | Pagan |
| 7,818,392 B1 | 10/2010 | Martino et al. |
| 7,911,513 B2 | 3/2011 | Garrison et al. |
| 7,973,230 B2 | 7/2011 | Mahowald |
| 8,005,913 B1 | 8/2011 | Carlander |
| 8,358,837 B2 | 1/2013 | Shakya et al. |
| 8,380,725 B2 | 2/2013 | Borst et al. |
| 8,537,981 B1 | 9/2013 | Cyriac et al. |
| 8,548,447 B1* | 10/2013 | Kirchhoff ......... H04M 3/42059 379/211.02 |
| 8,700,409 B1 | 4/2014 | Persson et al. |
| 8,832,374 B1 | 9/2014 | Schaefers |
| 8,838,719 B1* | 9/2014 | Faulk ................... H04L 51/212 709/204 |
| 8,917,848 B2 | 12/2014 | Torgersrud et al. |
| 8,929,525 B1 | 1/2015 | Edwards |
| 9,083,850 B1 | 7/2015 | Higgs |
| 9,106,789 B1 | 8/2015 | Shipman, Jr. et al. |
| 9,268,734 B1 | 2/2016 | Ward et al. |
| 9,282,087 B1 | 3/2016 | Fredinburg et al. |
| 9,332,014 B2 | 5/2016 | Keiser et al. |
| 9,485,110 B2 | 11/2016 | Kim et al. |
| 9,674,198 B1 | 6/2017 | Hodge |
| 9,930,042 B2 | 3/2018 | Hodge |
| 11,213,754 B2* | 1/2022 | Hodge ..................... A63F 13/32 |
| 11,394,754 B2* | 7/2022 | Evans ................. H04L 65/1079 |
| 2001/0001159 A1 | 5/2001 | Ford |
| 2002/0147782 A1 | 10/2002 | Dimitrova et al. |
| 2003/0126267 A1 | 7/2003 | Gutta et al. |
| 2003/0192044 A1 | 10/2003 | Huntsman |
| 2004/0006767 A1 | 1/2004 | Robson et al. |
| 2004/0172652 A1 | 9/2004 | Fisk et al. |
| 2005/0022229 A1 | 1/2005 | Gabriel et al. |
| 2005/0071481 A1* | 3/2005 | Danieli ................. H04L 69/329 709/204 |
| 2005/0075885 A1* | 4/2005 | Danieli ................... A63F 13/79 704/276 |
| 2005/0268317 A1 | 12/2005 | Cormack et al. |
| 2006/0031870 A1 | 2/2006 | Jarman et al. |
| 2006/0075015 A1 | 4/2006 | Wu et al. |
| 2006/0080702 A1 | 4/2006 | Diez et al. |
| 2006/0081702 A1* | 4/2006 | Nandakumar ......... G06Q 20/02 235/380 |
| 2006/0095262 A1 | 5/2006 | Danieli |
| 2006/0126964 A1* | 6/2006 | Chen .................... G06V 40/162 382/286 |
| 2006/0218611 A1 | 9/2006 | Son et al. |
| 2006/0280177 A1 | 12/2006 | Gupta et al. |
| 2007/0038567 A1 | 2/2007 | Allaire et al. |
| 2007/0157281 A1 | 7/2007 | Ellis et al. |
| 2008/0059991 A1 | 3/2008 | Romano |
| 2008/0102856 A1* | 5/2008 | Fortescue ............... H04W 4/02 455/456.1 |
| 2008/0104227 A1* | 5/2008 | Birnie .................. H04L 67/54 709/224 |
| 2008/0134282 A1 | 6/2008 | Fridman et al. |
| 2008/0171600 A1* | 7/2008 | Ostergren .............. A63F 13/71 463/42 |
| 2008/0184284 A1 | 7/2008 | O'Hern |
| 2008/0201158 A1 | 8/2008 | Johnson et al. |
| 2008/0222717 A1* | 9/2008 | Rothstein ............. H04L 63/1416 726/14 |
| 2008/0250484 A1 | 10/2008 | Chong et al. |
| 2008/0268947 A1* | 10/2008 | Fyock .................. H04L 67/131 463/29 |
| 2009/0013052 A1 | 1/2009 | Robarts et al. |
| 2009/0013359 A1 | 1/2009 | Butler et al. |
| 2009/0089828 A1 | 4/2009 | Carlsgaard et al. |
| 2009/0228557 A1 | 9/2009 | Ganz et al. |
| 2009/0234784 A1 | 9/2009 | Buriano et al. |
| 2009/0240586 A1 | 9/2009 | Ramer et al. |
| 2009/0254499 A1 | 10/2009 | Deyo |
| 2009/0264202 A1* | 10/2009 | Chen ..................... A63F 13/335 463/43 |
| 2009/0313546 A1 | 12/2009 | Katpelly et al. |
| 2009/0328093 A1 | 12/2009 | Cansler et al. |
| 2010/0094878 A1 | 4/2010 | Soroca et al. |
| 2010/0138455 A1 | 6/2010 | Alewine |
| 2011/0004831 A1 | 1/2011 | Steinberg et al. |
| 2011/0065419 A1 | 3/2011 | Book et al. |
| 2011/0093473 A1 | 4/2011 | Basso et al. |
| 2011/0153328 A1 | 6/2011 | Lim et al. |
| 2011/0237221 A1 | 9/2011 | Prakash et al. |
| 2011/0249073 A1 | 10/2011 | Cranfill et al. |
| 2011/0251901 A1 | 10/2011 | Kwon et al. |
| 2011/0307548 A1 | 12/2011 | Fisk et al. |
| 2012/0122438 A1 | 5/2012 | Renou |
| 2012/0201362 A1 | 8/2012 | Crossan et al. |
| 2012/0239763 A1 | 9/2012 | Musil |
| 2012/0257583 A1 | 10/2012 | Keiser et al. |
| 2012/0262271 A1 | 10/2012 | Torgersrud et al. |
| 2012/0283023 A1* | 11/2012 | O'Kelley, II ......... A63F 13/795 463/42 |
| 2012/0324244 A1 | 12/2012 | Zipperer et al. |
| 2013/0090917 A1 | 4/2013 | Chalmers et al. |
| 2013/0110565 A1* | 5/2013 | Means, Jr. ........... G06Q 10/063 705/7.11 |
| 2013/0179491 A1* | 7/2013 | Bennett ............... H04L 65/1093 709/203 |
| 2013/0179949 A1 | 7/2013 | Shapiro |
| 2013/0252575 A1 | 9/2013 | Ewell et al. |
| 2013/0252737 A1* | 9/2013 | Mescon .................. A63F 13/35 463/42 |
| 2014/0029615 A1 | 1/2014 | Baldwin et al. |
| 2014/0033230 A1 | 1/2014 | Hanna et al. |
| 2014/0196078 A1 | 7/2014 | Ow et al. |
| 2014/0215391 A1 | 7/2014 | Little et al. |
| 2014/0218466 A1 | 8/2014 | Bloms et al. |
| 2014/0229866 A1* | 8/2014 | Gottlieb ................. H04N 7/15 709/204 |
| 2014/0253663 A1 | 9/2014 | Edwards |
| 2014/0267547 A1 | 9/2014 | Torgersrud et al. |
| 2014/0270126 A1 | 9/2014 | Torgersrud et al. |
| 2014/0273929 A1 | 9/2014 | Torgersrud |
| 2014/0279789 A1 | 9/2014 | Torgersrud |
| 2014/0280524 A1 | 9/2014 | Paradise et al. |
| 2014/0280559 A1 | 9/2014 | Torgersrud |
| 2014/0280632 A1 | 9/2014 | Torgersrud et al. |
| 2014/0282898 A1 | 9/2014 | Torgersrud |
| 2014/0325561 A1 | 10/2014 | Allen et al. |
| 2014/0344956 A1 | 11/2014 | Garben |
| 2014/0364201 A1* | 12/2014 | Tanibuchi ............. A63F 13/812 463/25 |
| 2015/0025882 A1* | 1/2015 | Park ..................... H04M 1/7243 715/752 |
| 2015/0050910 A1 | 2/2015 | Torgersrud |
| 2015/0070516 A1* | 3/2015 | Shoemake ......... H04N 21/4542 348/207.11 |
| 2015/0188925 A1 | 7/2015 | Gupta |
| 2015/0215254 A1 | 7/2015 | Bennett |
| 2015/0301703 A1 | 10/2015 | Steinberg et al. |
| 2015/0339461 A1* | 11/2015 | Min ..................... H04L 51/043 726/28 |

(56) References Cited

U.S. PATENT DOCUMENTS

| | | | |
|---|---|---|---|
| 2016/0192033 A1 | 6/2016 | Kitahara et al. | |
| 2016/0191484 A1 | 7/2016 | Gongaware | |
| 2016/0243450 A1* | 8/2016 | Cotter | A63F 13/86 |
| 2016/0246791 A1 | 8/2016 | Long et al. | |
| 2016/0248766 A1 | 8/2016 | Tembey et al. | |
| 2016/0300388 A1 | 10/2016 | Stafford et al. | |
| 2017/0064384 A1 | 3/2017 | Sahoo et al. | |
| 2017/0262635 A1 | 9/2017 | Strauss et al. | |
| 2017/0272435 A1 | 9/2017 | Hodge | |
| 2017/0272440 A1 | 9/2017 | Hodge | |
| 2019/0046883 A1 | 2/2019 | Hodge | |
| 2019/0069029 A1 | 2/2019 | Petty | |

OTHER PUBLICATIONS

DSKeye Gigabit Product Brief, Bitec Ltd. 2007; 2 pages.

Excerpt from Merriam-Webster's Collegiate Dictionary, Tenth Edition, 2002; p. 841.

Excerpt from The American Heritage Dictionary, 5th Ed. (2016); p. 679.

Excerpts from "iPhone: The Missing Manual," 6th ed., Sebastopol, CA: O'Reilly Media, 2012; 556 (submitted in 10 parts).

File History of U.S. Pat. No. 9,083,850, U.S. Appl. No. 13/931,857, filed Jul. 14, 2015.

Gotsopoulos et al., "Remote Controlled DSP Based Image Capturing and Processing System Featuring Two-Axis Motion," Proceedings of the 4th European DSP in Education and Research Conference, Dec. 1-2, 2010; pp. 32-36.

International Search Report and Written Opinion directed to International Patent Appl. No. PCT/US2017/031317, mailed Aug. 2, 2017; 16 pages.

International Search Report and Written Opinion directed to International Patent Application No. PCT/US2017/022163, mailed Jun. 9, 2017; 12 pages.

Prosecution History of U.S. Pat. No. 8,929,525, U.S. Appl. No. 14/323,582, filed Jul. 3, 2014.

U.S. Appl. No. 61/801,861, filed Mar. 15, 2013; 77 pages.

OpenSong Getting Started. Online, retrieved from www.archive.org, Archive date: 2016.

ScoreCioud, Online, retrieved from www.archive.org, Archive date: 2016.

Censorship of Music (Wikipedia), retrieved from www.archive.org, Archive date: 2016.

International Search Report and Written Opinion directed to International Patent Application No. PCT/US2018/046017, mailed Nov. 5, 2018; 10 pages.

* cited by examiner

| | | |
|---|---|---|
| User | Nathan Days | |
| Handle | n_diaz | |
| Reputation | Great | |
| Purchased Games | Mega Race | 411 |
| | Championship Boxing | 412 |
| | Plumber Brothers | 413 |
| | Tetris | 414 |
| Block List | Conorthered | 421 |
| | Kurt_p | 422 |
| | MichaelTheMenace | 423 |
| High Risk List | don_cowboy | 431 |
| | REO | 432 |

FIG. 4

Game: Mega Race

| Group | Stunners |
|---|---|
| Record | 15-5-2 |
| Rank | 1 |
| Members | n_diaz |
|  | TY |
|  | Innovate |
|  | Jonsnow |

| Group | Copycats |
|---|---|
| Record | 13-7-3 |
| Rank | 2 |
| Members | Conor thered |
|  | Biohazard |
|  | REO |
|  | Scar |

| Group | Cell block_C |
|---|---|
| Record | 12-8-5 |
| Rank | 3 |
| Members | don_cowboy |
|  | Forever King |
|  | Hayatei |
|  | joejoe |

| Group | the_jailbirds |
|---|---|
| Record | 11-9-7 |
| Rank | 4 |
| Members | andy_dufresne |
|  | jean_valjean |
|  | Charles darnay |
|  | ed_dantes |

FIG. 5

VIDEO GAME CENTER FOR A CONTROLLED ENVIRONMENT FACILITY

CROSS-REFERENCE TO RELATED APPLICATIONS

This application is a continuation of U.S. patent application Ser. No. 15/674,344, filed on Aug. 10, 2017, which is incorporated by reference herein in its entirety.

FIELD

The disclosure relates to video game systems to allow for secure gaming in a controlled-environment facility.

BACKGROUND

Video games have become as ubiquitous and profitable as the film industry in recent years. Globally, in 2014 the gaming industry is estimated to have produced 83.6 billion dollars in revenue, dwarfing global film box office receipts by nearly 50 billion dollars. In 2015, 155 million of the U.S. population was found to play at least some form of video games, with ~80% out of every five households containing at least one device that can be used to play video games, and 51% of all households owning a dedicated game console such as an Xbox or Playstation console. Video games have also been found to have potential therapeutic effects in a variety of environments. Finally, video game spectating, wherein people view either live broadcasts or on-demand replays of video game sessions, has also exploded in the last decade.

In the context of controlled environment facilities, such as correctional facilities, video gaming has huge potential to impact the lives of the tenants within those environments. However, many video games are by nature co-operative or competitive are played between multiple live users. This may cause security issues in controlled environment facilities. Thus, systems and measures must be designed that allow for the beneficial and entertaining aspects of video gaming to be exploited within a controlled environment while addressing the myriad security concerns of that environment.

BRIEF DESCRIPTION OF THE DRAWINGS/FIGURES

The accompanying drawings, which are incorporated herein and form a part of the 10 specification, illustrate embodiments of the present disclosure and, together with the description, further serve to explain the principles of the disclosure and to enable a person skilled in the pertinent art to make and use the embodiments.

Figure 3A:
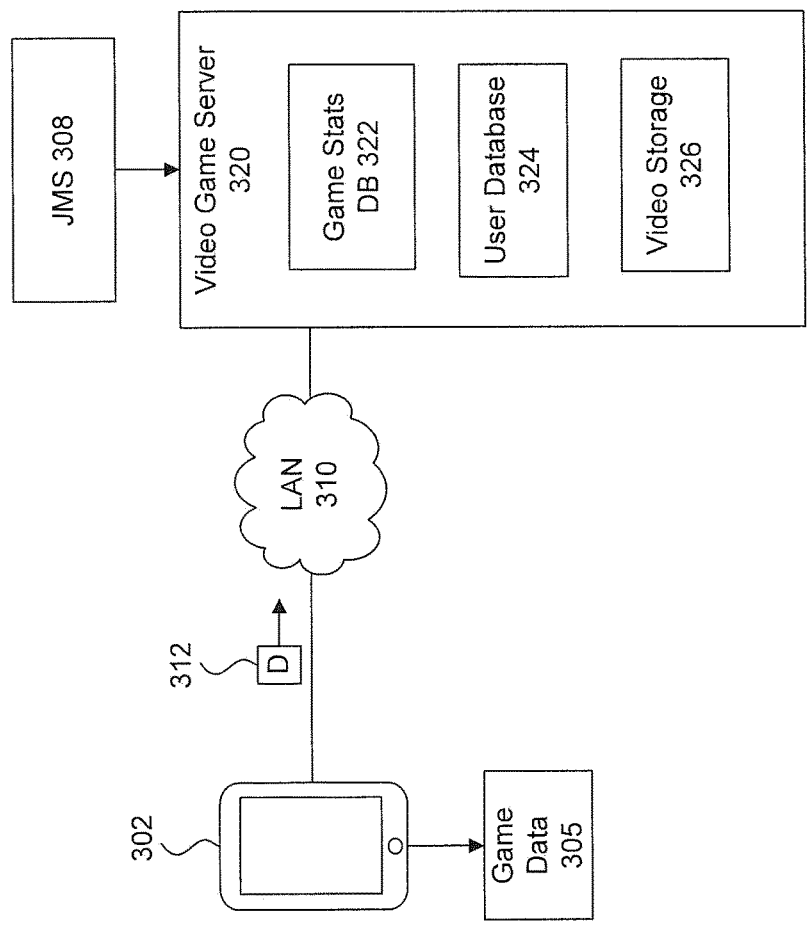
Figure 3B:
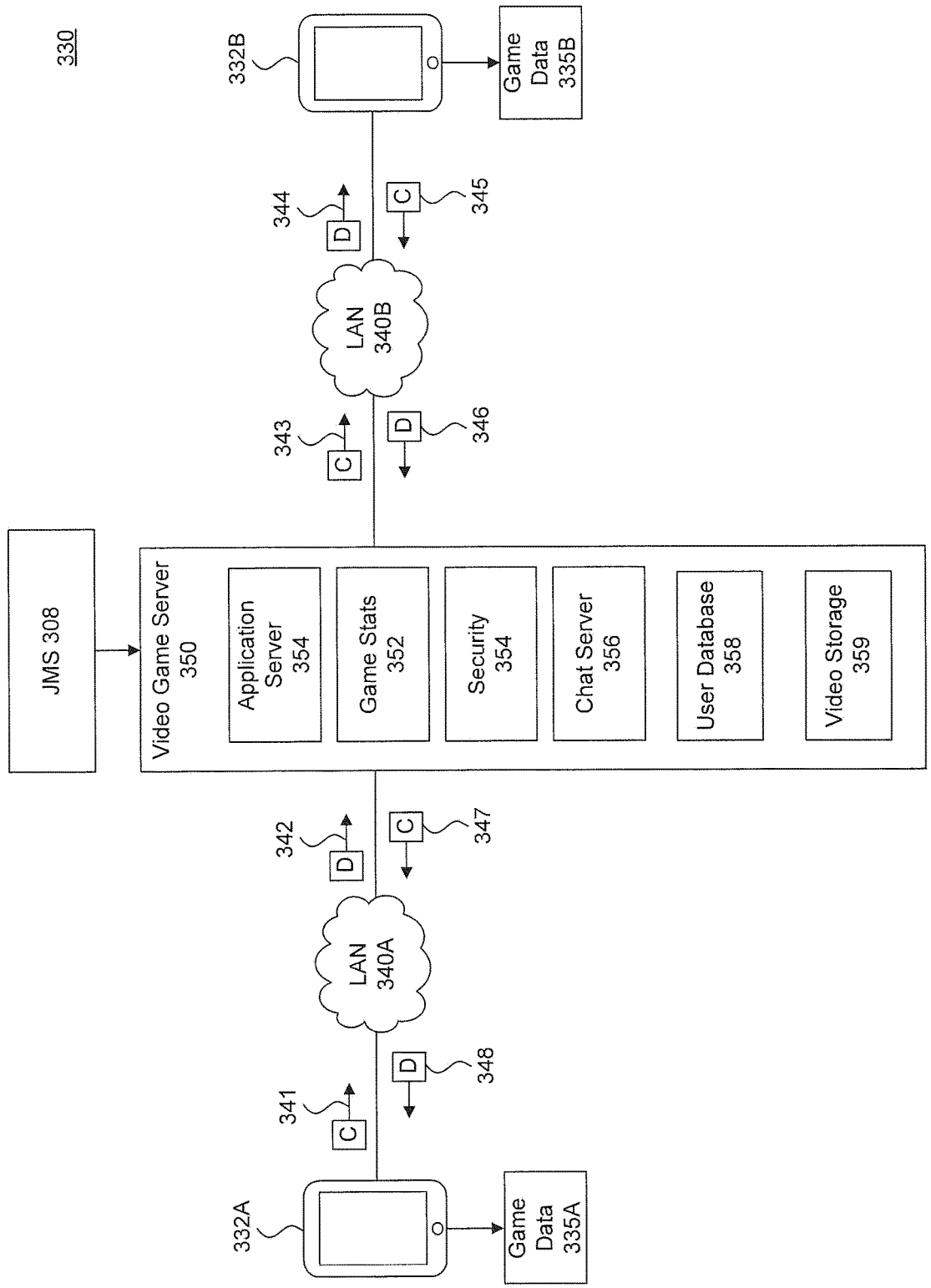
Figure 3C:
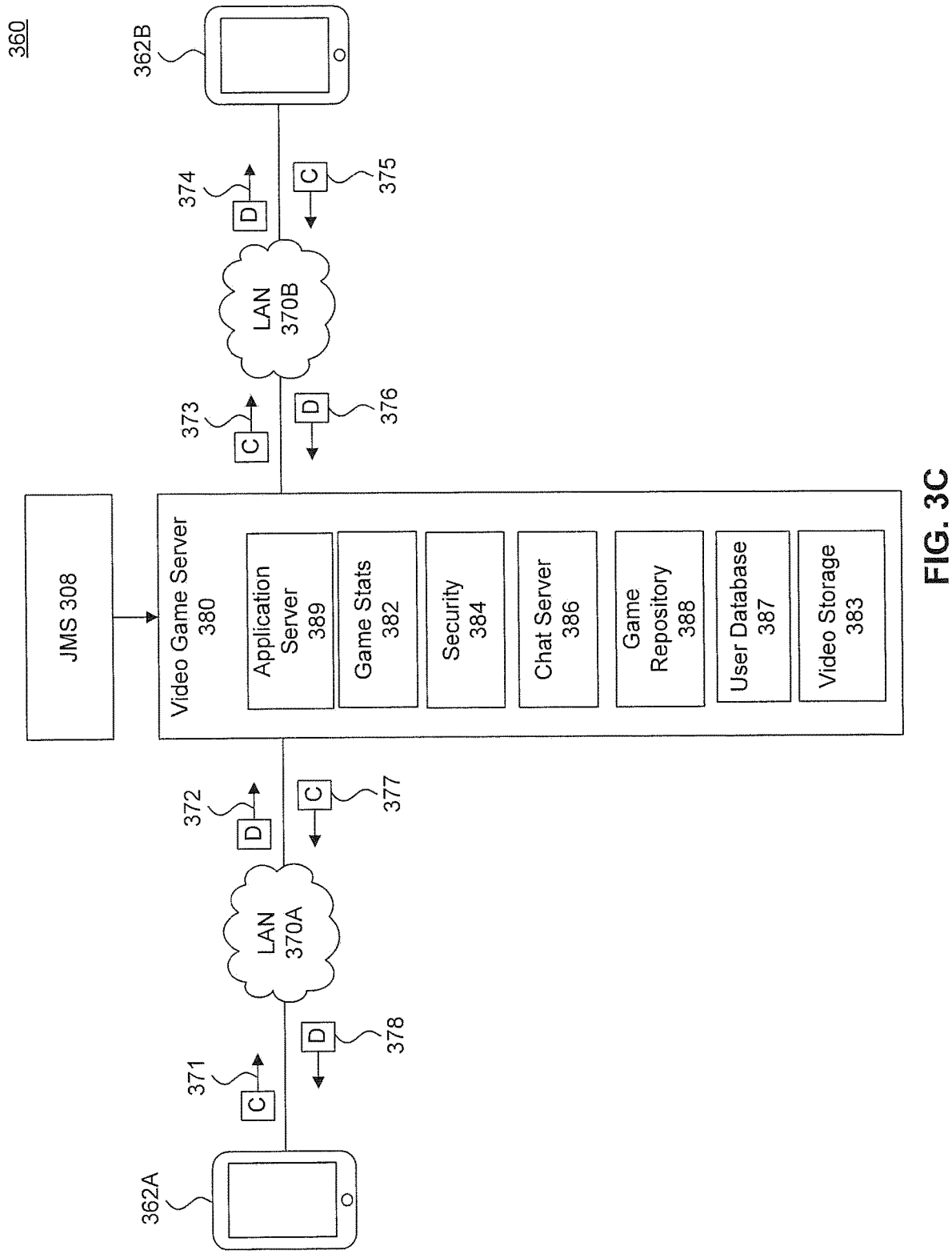

FIG. 3A-C illustrate different configurations of a video game server, according to embodiments.

FIG. 4 illustrates a user profile for a video game server, according to embodiments.

FIG. 5 illustrates team profiles for a video game server, according to embodiments.

Figure 6:
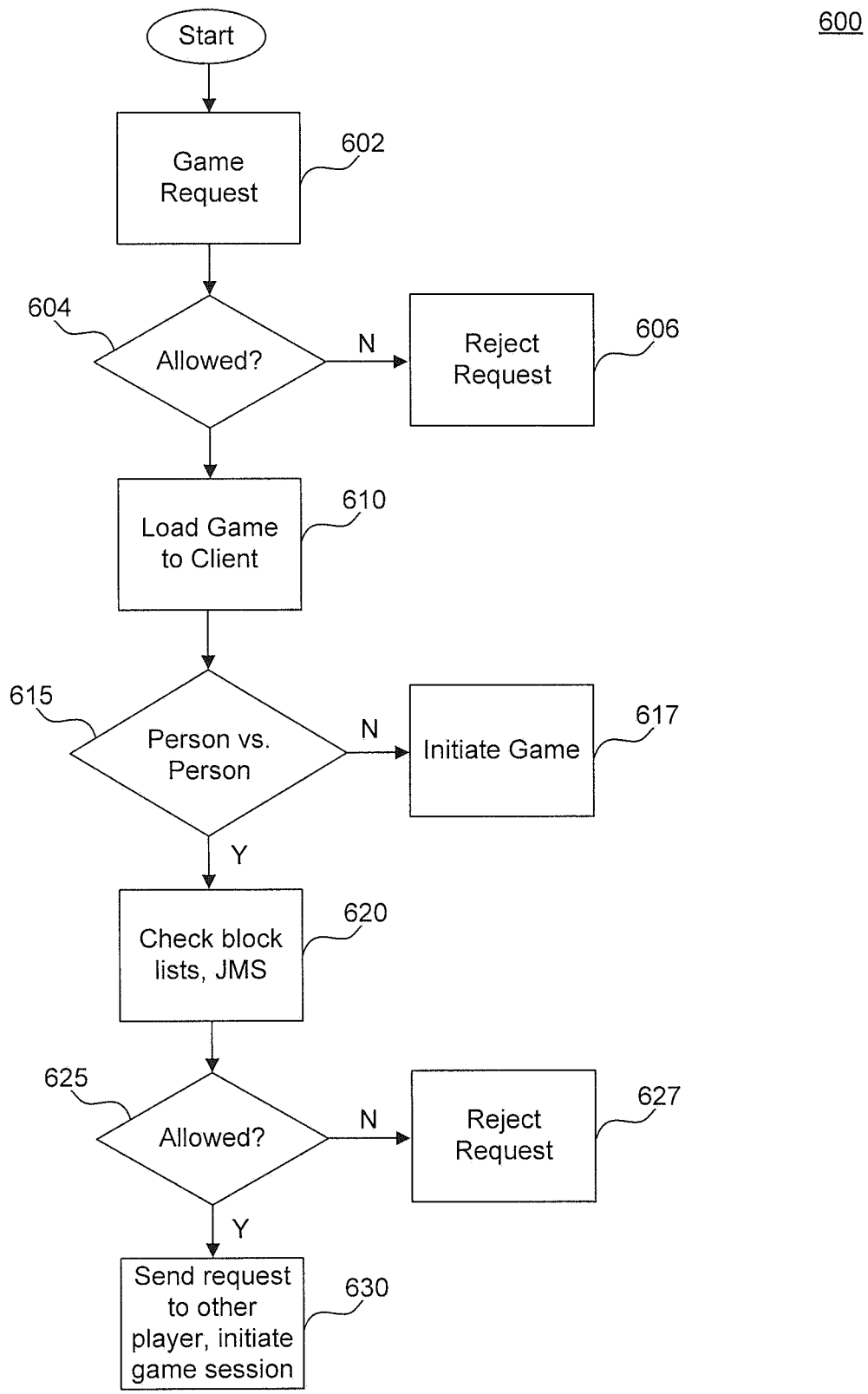

FIG. 6 illustrates a flowchart for initiating a game session according to an embodiment.

Figure 7:
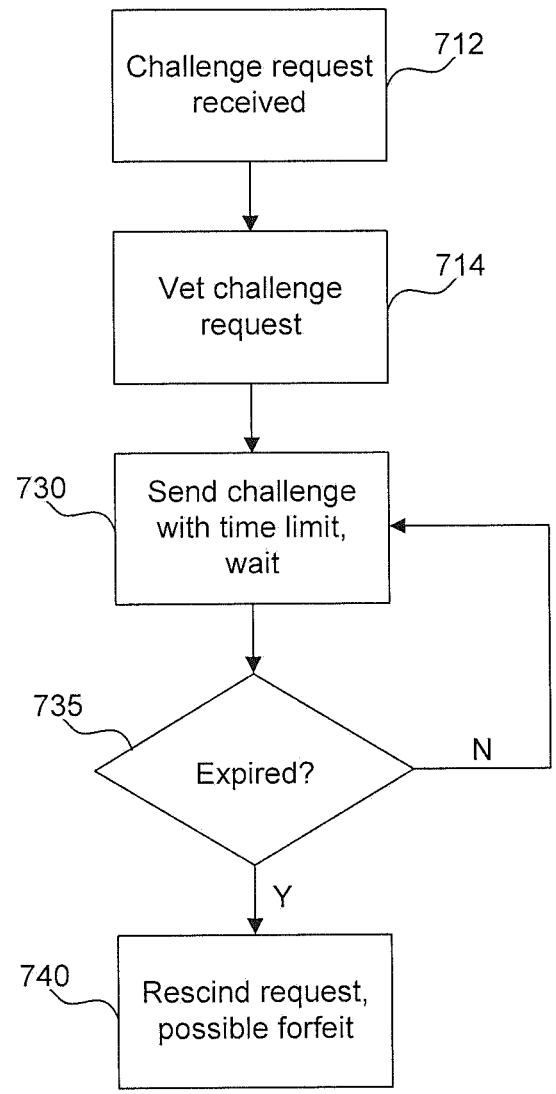

FIG. 7 illustrates a flowchart for initiating a challenge request between users of the video game server, according to embodiments.

Figure 8:
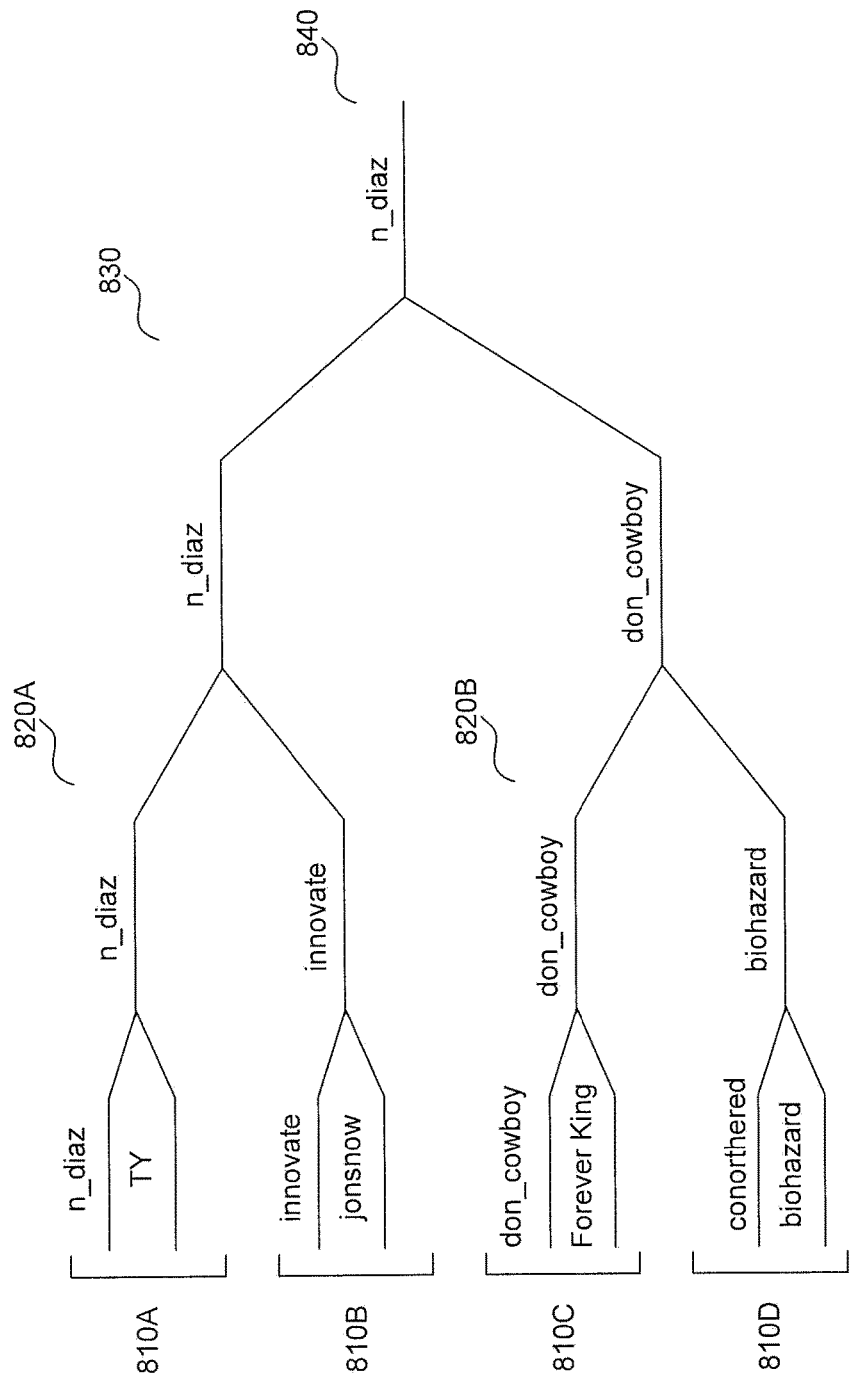

FIG. 8 illustrates a tournament competition of a video game server, according to embodiments.

Figure 9:
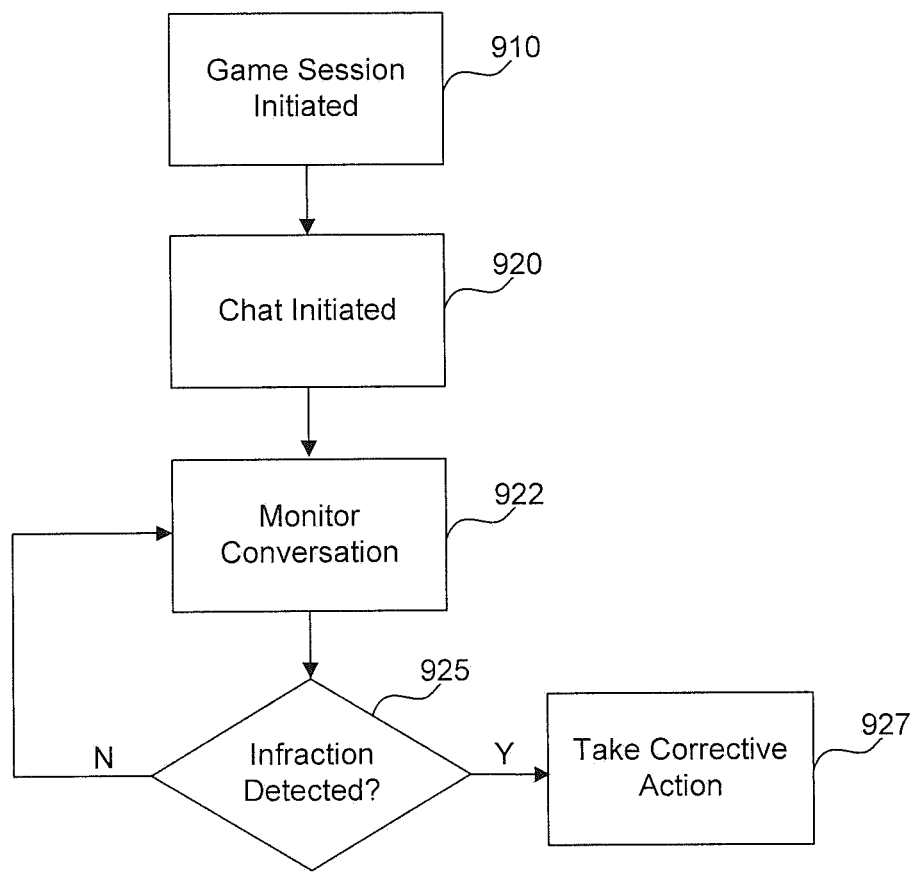

FIG. 9 illustrates a flowchart for monitoring conversation during a game session, according to embodiments.

Figure 10:
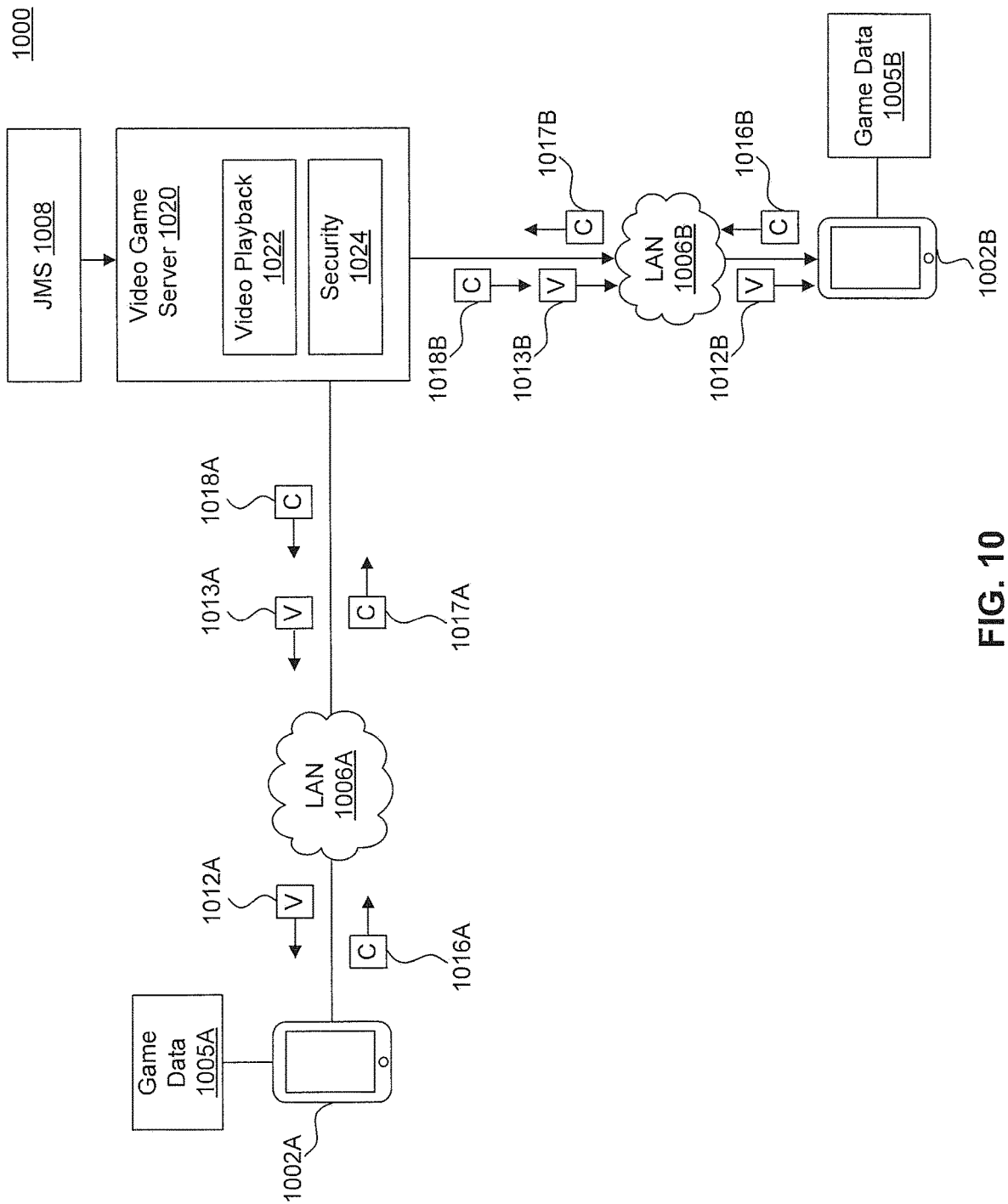

FIG. 10 illustrates a system for video playback of a game session, according to embodiments.

Figure 11:
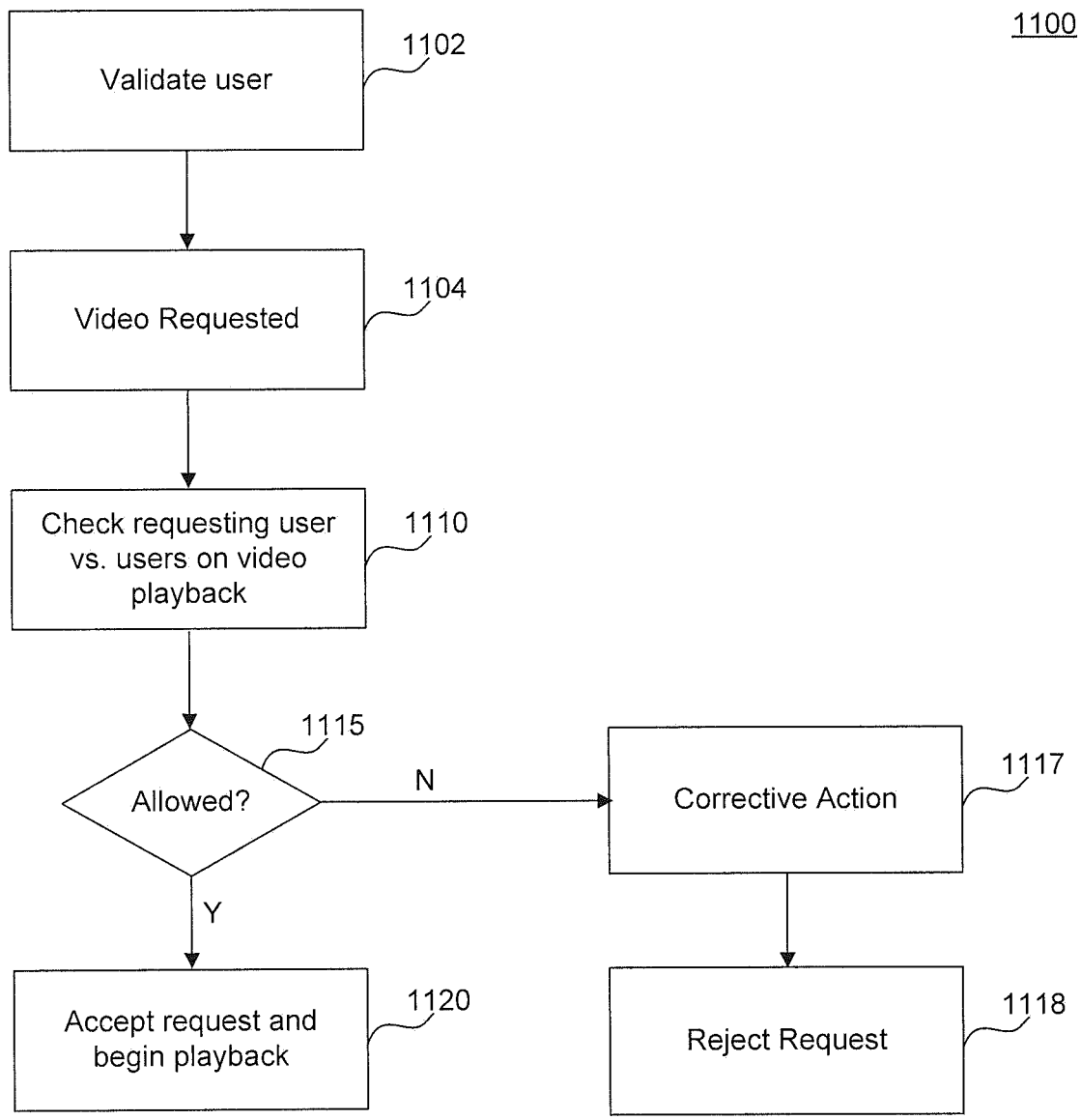

FIG. 11 illustrates a flowchart for requesting video playback, according to embodiments.

Figure 12:
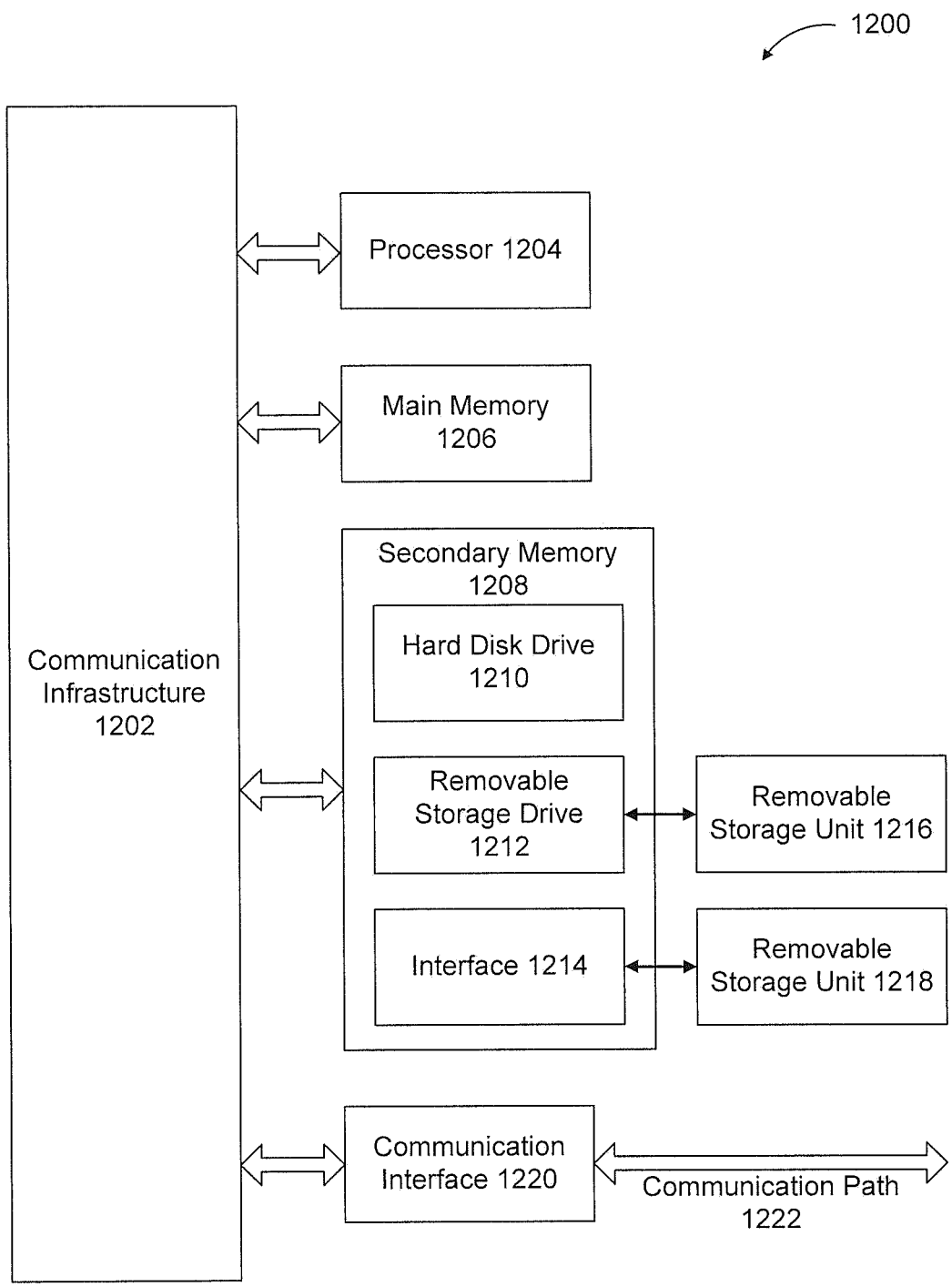

FIG. 12 illustrates a computer system, according to exemplary embodiments of the present disclosure.

The present disclosure will be described with reference to the accompanying drawings. In the drawings, like reference numbers indicate identical or functionally similar modules.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following detailed description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Figure 1:
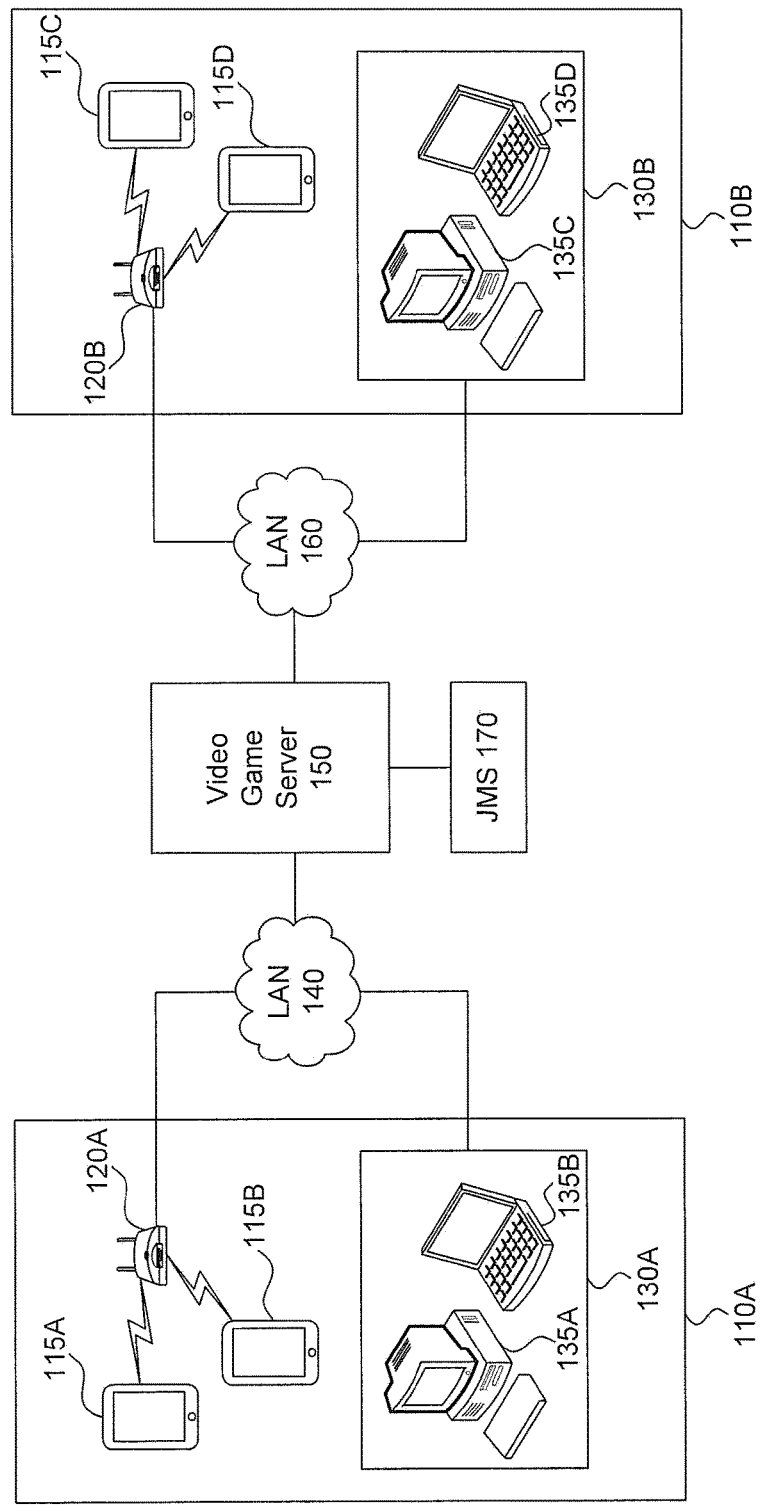
FIG. 1 illustrates a system of a controlled environment utilizing a video game center, according to embodiments.

FIG. 1 illustrates system 100 of a controlled environment facility that employs a video game center, according to some embodiments. In embodiments, system 100 includes a controlled environment facilities 110A and 110B, local area networks (LANs) 140 and 160, video game center system 150, a jail management server (JMS) 170, and a financial accounting system 180. Controlled environment facility 110A may include electronic devices 115A-B, and controlled environment facility 110B may include electronic devices 115C-D. In embodiments, electronic devices 115A-D may be smartphone devices, tablet devices, or other small personal computing devices (PCs) that are issued by the controlled environment facilities to tenants of the controlled environment facilities. Controlled environment facility 110A may include enclosure 130A that includes electronic devices 135A-B, and facility 110B may include enclosure 130B that electronic devices 135C-D. Enclosures 130A and 130B may be publically accessible, secure rooms in which tenants of controlled environment facilities 110A and 110B may enter to engage in video gaming or other general purpose computing (such as web surfing).

Electronic devices 115A-B may be connected to LAN 140 via wireless access point 120A, and electronic devices 115C-D may be connected to LAN 160 via wireless access point 120B. In embodiments, wireless access points 120A and 120B may be operating on a wireless standard such as IEEE 802.11, or a base station operating on 3G or 4G standards such as Universal Mobile Telecommunication System (UMTS), Global System for Mobile Communications (GSM), Long-term Evolution (LTE), etc. The base station could be a "small-cell" or "femtocell" technology similar to a commercially available base station meant to cover smaller or confined areas. In any case, security parameters and settings available with the equipment allow secure transmission of voice and other data to LANs 140 and 160. Wireless access points 120A and 120B may be connected to LANs 140 and 160 respectively via a wired interface using IEEE 802.3 "Ethernet" connections. Similarly, electronic devices 135A-B may be connected to LAN 140 via a wired connection via a wired interface using IEEE 802.3 "Ethernet" connections. Electronic devices 135C-D may be connected to LAN 160 via a wired connection via a wired interface using IEEE 802.3 "Ethernet" connections.

LANs 140 and 160 serve to connect the various electronic devices within controlled environment facilities 110A and 110B to the video game server 150. Video game server 150 serves the various functions that allow video games to be played on electronic devices 115A-D and 135A-D. In addition, the video game server 150 performs the functions to allow interactive video game playing between the users of electronic devices 115A-D and 135A-D, allowing for cooperative or competitive gameplay between different tenants of controlled environment facilities 110A and 110D. In embodiments, video game server 150 may be implemented on one or many server devices, each of which include processors, memory, long-term storage, and various communicative ports such as IEEE 802.3 Ethernet that allow the servers to interlink with each other and with LANs 140 and 160. In embodiments, video game server 150 may store some or all of the game data for the video games that are deemed suitable for tenants of controlled environment facilities 110A and 110B. In embodiments, some or all of the game data may be transmitted to electronic devices 115A-D and 135A-D during a game session. Different configurations that allow video game server 150 to serve video gaming to controlled environment facilities 110A and 110B will be discussed in greater detail below with respect to FIGS. 3A-C.

In embodiments, video game server 150 may also be connected to jail management server (JMS) 170. JMS 170 can consist of one or many servers, and hosts a database that stores broad information on tenants of controlled environment facilities 110A and 110B. JMS 170 is maintained by controlled environment facility administration or by the provider of video game server 150. The behavioral history will contain information regarding an tenant's past infractions within the controlled environment facility itself (e.g., altercations with other tenants) and also infractions related to video gaming behavior.

JMS 170 may also include information relating to the financial accounts for tenants of controlled environment facilities 110A and 110B. In embodiments, a tenant of a controlled environment facility may have a financial account associated with the tenant that can be used to purchase items and services from the controlled environment facility. This financial account may be debited when such services and items are purchased. In embodiments, for a tenant that wishes to engage in video gaming, the financial account associated with the tenant may be debited to pay a registration fee associated with creating an account within video game server 150, or purchase games offered by video game server 150.

Figure 2:
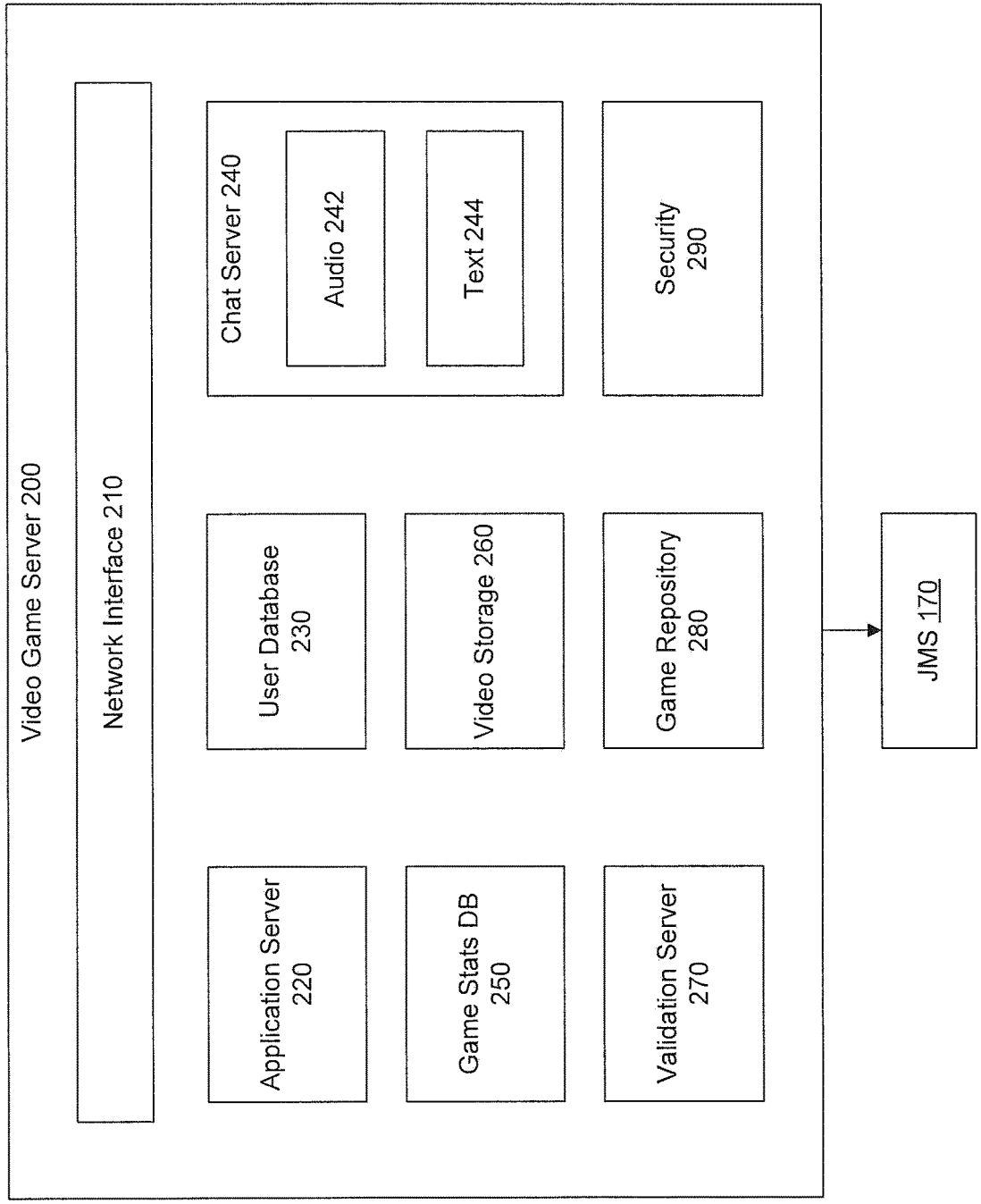
FIG. 2 illustrates a block diagram of a video game server, according to embodiments.

FIG. 2 illustrates a block diagram of video game server 200 according to some embodiments. Video game server 200 may be an embodiment of video game server 150 depicted in FIG. 1. Video game server 200 includes a network interface 210, application server 220, user database 230, chat server 240, game stats database 250, video storage 260, and validation server 270. In embodiments, the various elements of video game server 200 may be implemented on one or many servers, each of which include processors, memory, long-term storage, and various communicative ports such as IEEE 802.3 Ethernet that allow the servers to interlink with each other and with LANs such as LAN 140 and 160 of FIG. 1. Furthermore, video game server may be communicatively coupled to JMS 170.

Network interface 210 serves to connect the other elements of video game server 200 to outside networks. Network interface 210 is responsible for routing packets to and from video game server 200. This may include routing both game data and voice packet data between video game server 200 and LANs, such as LAN 140 and 160 of FIG. 1, that connect video game server 200 to controlled environment facilities such as controlled environment facilities 110A and 110B of FIG. 1. Application server 220 serves as the main processing center of the video game server 200, where applications execute for remote users which have logged into video game server 200. In an embodiment, instructions for a video game may execute directly in application server 220, and images of the video game may be sent to a device, such as devices 115A-D and 135A-D of FIG. 1, via network interface 210.

In another embodiment, instructions for a video game may execute in local devices at a controlled environment facility, such as devices 115A-D and 135A-D of FIG. 1, while application server 220 may host a game session involving two or more users using different devices within one or more controlled environment facilities. In this case, application server 220 may send and receive metadata related to video game progress, such as user positions within a game map, actions performed by the game characters as input by the users using the devices, and voice and text data being sent by users during the game session to communicate with the other users. In this embodiment, application server 220 is responsible for synchronizing the different game data such as action data, user positions, and metadata, as described above, to ensure that each user has an accurate and fair representation of the game session at any given time. Application server 220 is also responsible for synchronizing the voice and text data such that all users that are supposed to receive some set of data (for example, two users on a same team during a cooperative game session) receive that data in a timely fashion.

User database 230 stores information related to any tenants from controlled environment facilities that have registered with video game server 200 to play video games. In an embodiment, user database 230 is implemented on long-term storage such as a hard disk, storage area network, or network-attached storage. In embodiments, user database 230 may store a user profile for each registered user that has information such as a legal name, behavioral record, criminal record, and "block list" of other users that the user may not interact with. The user profiles stored in user database 230 may also include several other pieces of user information as related to video gaming conventions, which is described in greater detail relative to FIG. 4.

Chat server 240 performs functions related to both audio and textual communication between users during a competitive or cooperative game session. In embodiments, chat server 240 may be implemented on one or many servers, each of which include processors, memory, long-term storage, and various communicative ports such as IEEE 802.3 Ethernet that allow the servers to interlink with each other and with LANs such as LAN 140 and 160 of FIG. 1. The servers which implement chat server 240 may be included as part of the overall set of servers that implement video game server 200, or as a separate set of servers dedicated only to receiving and sending communication data separate from the game session data which is served by application server 220.

In embodiments, users who engage in either a competitive or cooperative game session may communicate via microphones that capture audio, such as a microphone on the electronic device they are using to access video game server 200, or a separate microphone that is communicatively coupled to the electronic device. The audio data may be sent as voice over internet protocol (VOIP) data packets that are received and sent by video game server 200 via network interface 210. In another embodiment they may also type text messages to each other that appear on-screen during a game session via a keyboard (either tactile or touch screen) that is included on the electronic device being used to access video game server 200, or a separate keyboard that is communicatively coupled to the electronic device. This text data may also be sent and received as data packets by video game server 200 via network interface 210.

Chat server 240 establishes a chat session by which the users participating in a game session may exchange communication data, either audio or text data as described above. Audio module 242 of chat server 240 may handle audio data received by chat server 240, while text module 244 may handle text data received by chat server 240. In an embodiment, audio module 242 receives audio data from different users engaging in a shared game session (either cooperative or competitive) and ensures that the audio data received is mixed properly and sent to other users that are permitted to receive the audio. The mixing of the audio data is required so that audio communication between different users is received in a timely fashion so that users are able to engage in intelligible conversation during a game session. Audio module 242 also ensures that audio data only be sent to users who are permitted to receive the audio information within the context of the game session. For example, a user may only wish to communicate with members of his own team during a team competition style of game (e.g. a football video game) to plan out strategy during a game session, or may wish to communicate with all users in the game session to engage in friendly or competitive banter.

Game stats database 250 stores information related to a video game served by video game server 200 that may be appropriate for public viewing. For example, high score data for either individuals or teams may be made available publically to users of a particular video game, or even to any users of the services offered by video game server 200. This may encourage competition and camaraderie between different tenants of the controlled environment facilities.

Video storage 260 stores videos of game sessions that may be played back by users of video game server 200. Video of a particular user's screen during a game session may be stored on video storage 260 which may then be played back by a user of video game server 200 for entertainment purposes. In an embodiment, user database 230 is implemented on long-term storage such as a hard disk, storage area network, or network-attached storage. In an embodiment, a user of video game server 200 may search through a library of videos to view playback of another user's game session, subject to security constraints such as the user not being on the block list of the other user, or vice versa. In addition, video storage 260 may store videos that may be investigated for potential security concerns, as will be described in more detail below.

Validation server 270 handles the validation steps required before a game session is initiated by video game server 200. In an embodiment, validation server 270 stores fingerprint samples and voice print samples of each user registered with video game server 200, so that when a user attempts to access the system, various comparison test can be performed to determine that the user has properly identified himself and is allowed to access video game server 200 to initiate a game session. Validation server 270 may also handle PIN inputs by the inmate.

Game repository 280 stores game data for any game offered by video game server 200. In an embodiment, user database 230 is implemented on long-term storage such as a hard disk, storage area network, or network-attached storage. In an embodiment, game data for a particular video game may be stored in game repository 280 and loaded onto application server 200 so that a user of video game server 200 may play the video game. In another embodiment, upon purchase of a video game by a user of video game server 200, game repository 280 sends the game data via network interface 210 to an electronic device being used by the user to access video game server 200. The game data for the video game is then permanently stored on the electronic device. When a user logs into video game server 200 using the electronic device, the video game is then made accessible to the user of the electronic device. If the user logs into the video game server 200 using a different electronic device, game repository 280 may again send the game data for the video game to the different electronic device.

Security module 290 handles detection of potential security issues during game sessions handled by video game server 200. In embodiments, users of video game server 200 may engage in illicit communications using a game session as a cover. For example, during a game session involving multiple users in either cooperative or competitive games, users may communicate via audio or text communications as described above. Users may communicate about illicit activity during a game session rather than about happenings in the game session. Furthermore, users may be able to alter the environment of a game session such that images may appear on screen that may also signal some kind of illicit communication.

In order to monitor potential for illicit activity, security module 290 may receive the audio packets, such as VoIP packets, or text data packets, as described above, and monitor their contents for potential security concerns. In embodiments, security module 290 receives packets from audio module 242 or text module 244 from within chat server 240. In embodiments, security module may monitor text data packets to see if key words or phrases are used that may signal some kind of illicit activity. In another embodiment, security module 290 uses speech recognition techniques to monitor audio decoded from audio packets, such as VoIP packets, for key words spoken by a user within the game session. In another embodiment, security module 290 uses speaker recognition techniques to inspect audio decoded from audio packets, such as VoIP packets, to determine if a particular user within the game session represents a voice that is not associated with the user, or if multiple voices are present within the audio packets received from a single user.

FIG. 3A illustrates a configuration for how a video game server and an electronic device operate during a game session, according to embodiments. FIG. 3A depicts video game server 320, electronic device 302, JMS 308, and LAN 310. Video game server 320 may be an embodiment of video game server 200 of FIG. 2 or video game server 150 of FIG. 1. Electronic device 302 may be an embodiment of electronic devices 115A-D and 135A-D of FIG. 1. JMS 308 may be an embodiment of JMS 170 of FIG. 1.

FIG. 3A depicts a configuration for a game which does not allow for cooperative or competitive play between two live users. In an embodiment, a user of electronic device 302 wishes to play a video game represented by game data 305. Game data 305 represents the vast majority of the instructions for executing the video game on the local device. This data may include world maps, image files, sound files, and any other game data that is not strictly related to the interactions between the user of the device and other users within the game session. In this case, because the game does not allow a game session with multiple users, there is no data to be received related to other users within the game session. The user accesses video game server 320 via LAN 310 via a wireless access point, such as wireless access point 120A or 120B of FIG. 1, or may access LAN 310 directly via a wireline connection using an Ethernet connection. Video game server 320 then confirms that the user is permitted to play the video game represented by game data 305 by checking the user's status in user database 324, and the user may then begin a game session by accessing game data 305. Game data 305 is stored locally at electronic device 302.

During the game session, session data 312 may be sent to video game server 320 via LAN 310. In embodiments, session data 312 may include video of the game session to be stored in video storage within video game server 320, such as video storage 326. Session data 312 may include high score information or timing information in the case of a speed run to be stored in game stats database 322.

FIG. 3B illustrates another configuration for how a video game server and an electronic device operate during a game session, according to embodiments. FIG. 3B depicts video game server 350, electronic devices 332A and 332B, JMS 308, and LANs 340A and 340B. Video game server 350 may be an embodiment of video game server 200 of FIG. 2 or video game server 150 of FIG. 1. Electronic devices 332A and 332B may be embodiments of electronic devices 115A-D and 135A-D of FIG. 1. JMS 308 may be an embodiment of JMS 170 of FIG. 1. LANs 340A and 340B may be embodiments of LAN 140 or 160 of FIG. 1.

FIG. 3B depicts a configuration in for a game where multiple users may play within a game session either cooperatively or competitively. In embodiments, users of electronic devices 335A and 335B access video game server 350 and request to play a video game represented by game data 335A and 335B. Game data 335A and 335B both represent the same video game, and are stored electronic devices 332A and 332B respectively. Game data 335A and 335B represents the vast majority of the instructions for executing the video game on the local devices. This data may include world maps, image files, sound files, and any other game data that is not strictly related to the interactions between the user of the device and other users within the game session. This data is accessed and executed locally by electronic devices 335A and 335B, while any data related to the positions and actions of other users within the game session is received from video game server 350. Video game server 350 may receive the requests and determine that the users of devices 332A and 332B both are permitted to play the video game represented by game data 335A and 335B by checking user database 358 to see that the users have purchased and are currently permitted to play the video game. Video game server 350 may check user database 358 to determine that the users of electronic devices 332A and 332B are permitted to play with each other in a single game session.

Video game server 350 may then start a game session that is joined by the users of electronic devices 332A and 332B via application server 354. As was discussed above, application server 354 hosts a game session and is responsible for synchronizing the different session data such as action data, user positions, and other metadata to ensure that each user within the game session has an accurate and fair representation of the game session at any given time. Game data 335A and 335B are stored locally in electronic devices 332A and 332B.

During the game session, electronic devices 332A and 332B may send and receive data from video game server 350. In particular, electronic devices may send and receive session data 342, 344, 346, and 348. Session data 342, 344, 346 and 348 represents action data, user positions, and other metadata that represent the actions and statuses of the user of electronic devices 332A and 332B during a game session. For example, in a game involving a world map such as a strategy game or a role-playing game, session data 342, 344, 346, and 348 may represent the position of the users of devices 332A and 332B within the world map. If a user performs a particular action, such as attacking the other user within the game session, session data 342, 344, 346, and 348 may also reflect that this action is taken. As was discussed above, application server 354 is responsible for ensuring that all of this data is synchronized properly such that the various metadata represented by session data 342, 344, 346, and 348 is giving a fair representation of each user's status while the game session is ongoing.

As with the configuration illustrated in FIG. 3A, session data 342, 344, 346, and 348 may include video of the game session to be stored in a video storage within video game server 320, such as video storage 359. Session data 342, 344, 346, and 348 may include high score information or timing information in the case of a speed run to be stored in game stats database 352.

In embodiments, the users of electronic devices 332A and 332B may also communicate with each other to coordinate their gameplay in a cooperative game, or to have friendly banter during a competitive game. Thus, electronic devices 332A and 332B may also send and receive a stream of communication data packets 341, 343, 345, and 347. In embodiments, communication data 341, 343, 345, and 347 may represent both audio data, represented by VoIP packets, and text data, represented by regular data packets. To handle these packets, video game server 350 employs chat server 356 to synchronize communication data packets 341, 343, 345, and 347 such that they are delivered in a timely and properly ordered fashion so that the users of electronic devices 332A and 332B are able to engage in intelligible conversation during a game session. In embodiments, chat server 386 may mix the audio derived from communication data packets and form mixed audio communication data packets. In such cases, communication data packets sent to electronic devices from video game server 350, such as communication data packets 343 and 347, may be mixed audio communication data packets reflecting the mixed audio of multiple users within the game session.

Because users may attempt to use the game session as a façade to engage in illicit conversations, security module 354 within video game server 350 may employ several algorithms to detect potential issues with the conversation between inmates. In an embodiment security module 354 may monitor text data packets to see if keywords or phrases are used that may signal some kind of illicit activity. In another embodiment, security module 354 uses speech recognition techniques to monitor audio decoded from audio packets, such as VoIP packets, for key words spoken by a user within the game session. In another embodiment, security module 354 uses speaker recognition techniques to inspect audio decoded from audio packets, such as VoIP packets, to determine if a particular user within the game session represents a voice that is not associated with the user, or if multiple voices are present within the audio packets received from a single user.

FIG. 3C illustrates another configuration for how a video game server and an electronic device operate during a game session, according to embodiments. FIG. 3B depicts video game server 380, electronic devices 362A and 362B, JMS 308, and LANs 370A and 370B. Video game server 380 may be an embodiment of video game server 200 of FIG. 2 or video game server 150 of FIG. 1. Electronic devices 362A and 362B may be embodiments of electronic devices 115A-D and 135A-D of FIG. 1. JMS 308 may be an embodiment of JMS 170 of FIG. 1. LANs 370A and 370B may be embodiments of LAN 140 or 160 of FIG. 1.

FIG. 3C depicts another configuration for a game where multiple users may play within a game session either cooperatively or competitively. In embodiments, users of electronic devices 362A and 362B access video game server 380 and request to play a video game. Video game data is not stored locally in electronic devices 362A and 362B, and is instead stored only in video game server 380 within game repository 388. Therefore, in the configuration of FIG. 3C, the instructions and large files for executing the video game on the local devices, including world maps, image files, sound files, and any other game data that is not strictly related to the interactions between the user of the device and other users within the game session, must be sent during the game session. In addition, any data related to other users within the current game session must also be sent during the game session, similar to the configuration depicted in FIG. 3B. Video game server 380 may receive the requests and determine that the users of devices 362A and 362B both are permitted to play the video game stored in game repository 388 by checking user database 387 to see that the users have purchased and are currently permitted to play the video game. Video game server 380 may check user database 387 to determine that the users of electronic devices 362A and 362B are permitted to play with each other in a single game session.

Video game server 380 may then start a game session that is joined by the users of electronic devices 362A and 362B via application server 389. As was discussed above, application server 389 hosts a game session and is responsible for synchronizing the different session data such as action data, user positions, and other metadata to ensure that each user within the game session has an accurate and fair representation of the game session at any given time. In an embodiment, application server 389 is responsible for sending game data stored in game repository 388 to electronic device 362A and 362B.

During the game session, electronic devices 362A and 362B may send and receive data from video game server 380. In particular, electronic devices may send and receive session data 372, 374, 376, and 378. Session data 372, 374, 376, and 378 represents action data, user positions, and other metadata that represent the actions and statuses of the user of electronic devices 362A and 362B during a game session. For example, in a game involving a world map such as a strategy game or a role-playing game, session data 372, 374, 376, and 378 may represent the position of the users of devices 362A and 362B within the world map. If a user performs a particular action, such as attacking the other user within the game session, session data 372, 374, 376, and 378 may also reflect that this action is taken. As was discussed above, application server 389 is responsible for ensuring that all of this data is synchronized properly such that the various metadata represented by session data 372, 374, 376, and 378 is giving a fair representation of each user's status while the game session is ongoing.

In embodiments, session data 372, 374, 376, and 378 may also include game data stored in game repository 388. Because in this configuration game data is not stored locally in electronic device 362A and 362B, application server 389 may also send game data regularly to electronic device 362A and 362B in addition to action data, user position, and other metadata.

As with the configuration illustrated in FIG. 3A, session data 372, 374, 376, and 378 may include video of the game session to be stored in a video storage within video game server 380, such as video storage 383. Session data 372, 374, 376, and 378 may include high score information or timing information in the case of a speed run to be stored in game stats database 382.

In embodiments, the users of electronic devices 362A and 362B may also communicate with each other to coordinate their gameplay in a cooperative game, or to have friendly banter during a competitive game. Thus, electronic devices 362A and 362B may also send and receive a stream of communication data packets 371, 373, 375, and 377. In embodiments, communication data 371, 373, 375, and 377 may represent both audio data, represented by VoIP packets, and text data, represented by regular data packets. To handle these packets, video game server 380 employs chat server 356 to synchronize communication data packets 371, 373, 375, and 377 such that they are delivered in a timely and properly ordered fashion so that the users of electronic devices 362A and 362B are able to engage in intelligible conversation during a game session. In embodiments, chat server 386 may mix the audio derived from communication data packets and form mixed audio communication data packets. In such cases, communication data packets sent to electronic devices 362A and 362B from video game server 380, such as communication data packets 373 and 377, may be mixed audio communication data packets reflecting the mixed audio of multiple users within the game session.

Because users may attempt to use the game session as a façade to engage in illicit conversations, security module 384 within video game server 380 may employ several algorithms to detect potential issues with the conversation between inmates. In an embodiment security module 384 may monitor text data packets to see if keywords or phrases are used that may signal some kind of illicit activity. In another embodiment, security module 384 uses speech recognition techniques to monitor audio decoded from audio packets, such as VoIP packets, for key words spoken by a user within the game session. In another embodiment, security module 384 uses speaker recognition techniques to inspect audio decoded from audio packets, such as VoIP packets, to determine if a particular user within the game session represents a voice that is not associated with the user, or if multiple voices are present within the audio packets received from a single user.

FIG. 4 illustrates a user profile 400 according to an embodiment. A video game server, such as video game server 150 of FIG. 1 or video game server 200 of FIG. 2, may store user profile for a user that has registered with the video game server. User profile 400 may include legal name 402, a user "handle" 404, reputation rating 406, a list of purchased games 410 including video games 411-414, block list 420 including other user handles 421-423, and high risk list 430 including user handle 431-432. This list of elements is not meant to be limiting.

Legal name 402 may be the legal name of the individual registered with the video game server. This name does not typically appear anywhere during a game session, and is only used for record keeping purposes. This allows the video game system to link with a JMS, such as JMS 170, to keep record of the activities of the user associated with the user profile. User handle 404 is the main identifying information by which users may identify each other and themselves during and prior to a game session. User handle 404 is used in game. In embodiments, during a game session, user handle 404 may appear on the screen of the user's electronic device when accessing the video game server, and on the screens of other users within the game session at various points during the game session. Prior to the game session beginning, this user handle may also appear on the screen of other users when selecting teams or competitors prior to a multi-player session beginning. This handle may also be associated with a high score list, where a high score in a game may be listed with the user handle that attained that high score in order to foster a competitive atmosphere for other users playing that game.

Reputation rating 406 is a rating that reflects the conduct of the user during game sessions. A user that is seen as a "poor sport", who is verbally abusive, or may otherwise be thought to be cheating may receive a poorer rating than another more well-behaved user. This rating may be based on the ratings given to the user by other users that have played alongside the user during a game session, and may also be changed by the administrator of a controlled environment facility in which the user resides or by the administrator of the video game server itself. In embodiments, reputation rating 406 may be used by the video game server to determine if a user's access to the video game server or to particular games which the user has purchased should be restricted. In embodiments, reputation rating 406 may be viewed by other users in the system prior to initiating a game session with that user. In embodiments, the rating may be a verbal rating ranging from "poor" to "great", or a numerical value from 1 to 10, or various other common reputation rating schemes.

Purchased game list 410 is a list of games which the user has purchased, and therefore may be permitted to play during a game session. In embodiments, this list will add an entry, such as video games 411-414, whenever a user purchases a video game. This list may be used by a validation server within the video game server, such as validation server of 270, to determine if a user may initiate a game session for a particular game.

Block list 420 is a list of user handles with which the user associated with handle 404 may not interact. In embodiments, this list may be changed by administrators of the controlled environment facility, an administrator of the video game server, or an authorized third party such as a law enforcement official. In embodiments, block list 420 may be based on a similar block list within a JMS, such as JMS 170 of FIG. 1. In embodiments, the user associated with user profile 400 sends a request to the video game server to initiate a game session with one of the user handles 421-423. The video game server, and in particular a validation server such as validation server 270 of FIG. 2 or a security module within the video game server such as security module 290 of FIG. 2, determines that the game session is not permitted because the user associated with user profile 400 is not allowed to engage in a game session with the user associated with one of the user handles 421-423 in block list 420. In this way, clear security challenges can be prevented by simply denying the users' the ability to engage in a game session with each other if those users are considered to be a security risk.

High risk list 430 is a list of user handles with which the user associated with handle 404 may interact, but is considered to be a high risk association. Thus, high risk list 430 is similar to block list 420 in that it flags user handles of users that may pose a security risk, but the security risk is not considered high enough to deny the initiation of a game session outright. In embodiments, this list may be changed by administrators of the controlled environment facility, an administrator of the video game server, or an authorized third party such as a law enforcement official. In embodiments, high risk list 420 may be based on a similar high risk list within a JMS, such as JMS 170 of FIG. 1. In embodiments, the user associated with user profile 400 sends a request to the video game server to initiate a game session with one of the user handles 431-432. The video game server, and in particular a validation server such as validation server 270 of FIG. 2 or a security module within the video game server such as security module 290 of FIG. 2, determines that the game session is high risk because the user associated with user profile 400 because the user associated with user profile 400 is attempting to initiate a game session with one of the high risk user handles 431-432. This game session may be flagged for extra scrutiny during the game session, and may also be investigated after the game session is complete. In an embodiment, the video game server may require that game session video is recorded from all users in the game session, so that the videos may be investigated for potential illicit activity after the game session is complete.

FIG. 5 illustrates team profiles according to an embodiment. Certain video games, such as video game 505, in this case called "Mega Race", may have a team play dynamic in which multiple users within a same team may play against another team. Team profiles 510-540 may store information about each team that has been created to play video game 505.

Each team may have a group handle, such as group handles 512, 522, 532, and 542, which are used to identify the team. In embodiments, during a game session, group handles 512, 522, 532, and 542, may appear on the screen of a user's electronic device when accessing the video game server, and on the screens of other users within the game session at various points during the game session. Prior to the game session beginning, this group handles 512, 522, 532, and 542, may also appear on the screen of other users when selecting teams or competitors prior to a multi-player session beginning. Each team may also have a record, such as records 514, 524, 534, and 544, which are associated with the team's performance in past game sessions. Each record 514, 524, 534, and 544, may have a win, loss and draw number associated with the group appearing in that order. For example, the team associated with team profile 410 may have a record of "15-5-2", indicating 15 wins, 5 losses, and 2 draws in 22 prior game sessions of video game 505.

Based on records 514, 524, 534, and 544, each team may also have a rank 516, 526, 536 and 546. This rank reflects the relative performance of the respective team relative to the other teams for video game 505. In FIG. 5, for example, the rank is based on the number of wins regardless of loss or draw numbers, so that the team associated with profile 510 has the highest rank of "1" because it has 15 wins in prior game sessions of video game 505, which is the largest number of wins achieved by any of the teams. The team associated with profile 2 has a rank of "2" because it has 13 wins in prior game sessions of video game 505. The other teams are ranked in similar fashion. In embodiments, the rank may be based on some weighted score of the win, loss, and draw record, depending on the particulars of the video game. In other embodiments, the rank may be based on some performance metric specific to the video game, such as speed with which a particular stage of the video game is completed.

Finally, each team has a member list, such as member lists 518, 528, 538, and 548, consisting of user handles 518A-D, 528A-D, 538A-D, and 548A-D respectively. These user handles reflect the members of each team. Thus, during a game session, user handles 518A-D may be considered part of the same team and may work cooperatively within the game session to defeat the members of the other team. In embodiments, the user handles of each team may be associated with their own respective block lists, such as block list 420 of FIG. 4, which may prevent particular teams from engaging in a competitive game session because the user handles in the member list of one team may appear on the block lists of user handles of the other team. In embodiments, a game session where a user handle from one team appears on the block list of a user handle of the opposing team may still be allowed, where any attempted communication between members of opposing teams may simply be discarded by the video game server. Thus, members within one team, such as the members associated with user handles 518A-D, may still be able to communicate with each other to cooperate to win the current game session, but not be allowed to communicate with members of another team, such as the members associated with user handles 528A-D, if such block list issues exist as described above.

FIG. 6 illustrates flowchart 600 for initiating a game session, according to embodiments. In embodiments, the method illustrated by flowchart 600 may be performed by a video game server, such as video game server 200 of FIG. 2 or video game server 150 of FIG. 1.

In step 602, a game session request is received from a requesting user by the video game server. The game session request is received by a validation server within the video game server, such as validation server 270 of FIG. 2. The game session request may include a user handle of the requesting user, a video game that the user wishes to play during the game session, and one or more other user handles that the requesting user wishes to engage with in the game session. In step 604, the video game server determines if this game request is allowed. In embodiments, in step 604, a validation server of the video game server, such as validation server 270 of FIG. 2, may determine if the requesting user has purchased the video game being requested by checking a purchased games list, such as purchased games list 410 of FIG. 4, and if the requesting user's reputation rating, such as reputation rating 406 of FIG. 4, is high enough to permit the requesting user to play the game. If either of these conditions is not satisfied, then in step 606 the video game server may reject the request and the requesting user may not initiate a game session of the requested video game.

If the video game server does determine that the requesting user may play the game, then in step 610, the game data is loaded to the client. Depending on the video game configuration, such as those configurations depicted in FIGS. 3A-C, this step may be performed differently. In embodiments, if the game data is already present on the electronic device that the requesting user is using, such as in those configurations depicted in FIGS. 3A and 3B, only metadata that establishes the game session may be sent by the video game server to the requesting user. In other embodiments, if game data is not already present on present on the electronic device being used by the requesting user, then the video game server may send all of the game data to the electronic device, where it can either be permanently stored or deleted after the game session is complete.

In step 615, the video game server determines if the game session request received in step 602 also includes one or more other user handles with which the requesting user wishes to initiate a game session. If the request includes no such other user handles, then in step 617, the game session may be initiated and the requesting user may begin playing the game.

In embodiments, a video of the game session may be recorded by the electronic device. The electronic device may then send the video to the application server at the conclusion of the game session, at which point the application server may store the video in video storage within the video game server, such as video storage 260 of FIG. 2. In another embodiment, the application server may record a video of the game session, and then send the video to the video storage of the video game server. In an embodiment, the video of the video game session may be a video file of the game session in one of many known digital video standards, such as Moving Parts Expert Group 3 (MPEG-3). In another embodiment, the video of the video game is a record of all metadata received from the electronic device and sent to the electronic device during the game session, such as session data 312 of FIG. 3A, session data 342, 344, 346 and 348 of FIG. 3B, and session data 372, 374, 376 and 378 of FIG. 3C. Using this metadata, a "video" of the game session can be generated after the conclusion of the videogame where events that occur within the game session can be recreated using the metadata.

If other user handles do exist within the request, then in step 620 the video game server checks to determine if any of the user handles reflect users that the requesting user is not allowed to interact with. In embodiments, a validation server of the video game server, such as validation server 270 of FIG. 2, may check the block list associated with the requesting user, such as block list 420 of FIG. 4, to determine if the requesting user is attempting to initiate a game session with any of its blocked users, such as blocked user handles 421-423 of FIG. 4. If the video game server determines in step 625 that the game session is not allowed because the requesting user is attempting to initiate a game session with one of its blocked users, then the request is rejected in step 627 and the game session is not initiated. If the video game server determines that the game session is allowed, then in step 630 the video game server may send a request to the other user indicating that the requesting user wishes to initiate a game session with the other user.

When the other user receives the request via another electronic device, the other user may accept the request. At this point, the game session may be initiated by the video game server. An application server within the video game server, such as application server 220 of FIG. 2, may then perform the necessary actions to create the game session and begin exchanging data between with the requesting user and the other users in the game session, according to the video game configuration as depicted in FIGS. 3A-C.

In embodiments, the application server may record a video of the game session, and then send the video to video storage of the video game server, such as video storage 260 of FIG. 2. In an embodiment, the video of the video game session may be a video file of the game session in one of many known digital video standards, such as Moving Parts Expert Group 3 (MPEG-3). In another embodiment, the video of the video game is a record of all metadata received from the electronic device and sent to the electronic device during the game session, such as session data 312 of FIG. 3A, session data 342, 344, 346 and 348 of FIG. 3B, and session data 372, 374, 376 and 378 of FIG. 3C. Using this metadata, a "video" of the game session can be generated after the conclusion of the videogame where events that occur within the game session can be recreated using the metadata.

FIG. 7 illustrates flowchart 700 for initiating a challenge request from a requesting user to a challenged user. In embodiments, a requesting user may wish to challenge another user, referred to here as a challenged user, to compete in a video game. The challenged user, however, may not be available to initiate a game session with the requesting user at the time the challenge is issued, or may simply wish to ignore the challenge from the requesting user. In embodiments, the method depicted in FIG. 7 is performed by a video game server, such as video game server 200 of FIG. 2 or video game server 150 of FIG. 1.

In step 712, the video game server receives a challenge request from a requesting user that indicates a video game and a user handle which the requesting user wishes to challenge. In another embodiment, the requesting user may also associate the challenge request with a time limit which requires the challenged user to accept the challenge within a given time frame. If the time frame expires, then the challenge is rescinded. The video game server may vet the challenge request in step 714 to determine that the requesting user and the challenged user are allowed to engage each other in similar fashion to step 620 of FIG. 6. In embodiments, the video game server checks the block lists of both the requesting user and the challenged user to determine if the challenge request is allowed.

In step 730, the challenge request is sent to the challenged user. If the challenged user is not logged into the video game server at the time the challenge request is received, the challenge request may be stored in a user profile database, such as user profile database 230 of FIG. 2, and the challenged user will be notified of the pending challenge when the challenged user has logged into the video game server. In embodiments, the video game server may also associate the challenge request with a time limit.

In step 735, the video game server continuously monitors the challenge request to determine if the challenge request has expired. If the time limit has not expired, or if no time limit is associated with the challenge request, then video game server does not determine that the challenge request has expired. However, if the challenge request has expired, then in step 740 the challenge request is rescinded and the challenged user is not notified of the pending challenge request upon their accessing the video game server. In the case of tournament-style play, to be described below, the challenged user's place in a competition may also be forfeit if the challenged user fails to respond to a challenge request.

In embodiments, a video game server may also host a tournament competition of a particular video game, in which multiple users of the video game system may enter a competition to compete with each other. Video game server may schedule a series of match ups between the multiple users that enter the competition, and the users that are defeated in each match up are eliminated from the competition while the victorious user advances in the competition until all but one user remains in the tournament. In embodiments, the competition may also be a team competition in which different teams, such as those depicted in FIG. 5, may enter the competition rather than individual competitors.

FIG. 8 depicts a tournament competition that may be implemented by a video game server, according to an embodiment. As described above, a video game server, such as video game server 200 of FIG. 2 or video game server 150 of FIG. 1, may host a tournament competition where multiple users who have access to a particular video game are paired to compete, where the victors from respective game sessions are then paired against each other until all users but one are eliminated. Four game sessions 810A-D are started in which 8 users compete. After game sessions 810A-D conclude, four victors remain, at which point two game sessions 820A and 820B can pair the four victors from game sessions 810A-D. Game session 830 may pair the two victors from game sessions 820A and 820B, and the victor from game session 830 may be declared the winner of the tournament competition. A person with ordinary skill in the art will understand that the tournament style play depicted in FIG. 8 is not limited to eight players.

In embodiments, the video game server performs steps 714-740 of FIG. 7 to advance the tournament competition depicted in FIG. 7 forward. The video game server may itself generate the challenge requests after the pool of users in the tournament competition is established. In embodiments, the video game server does not issue challenge requests for two users if either user appears in the other's block list. This extends to team tournament competitions as well, where the video game server may not issue challenge requests for two teams if members of either team appear in the block lists of the members of the other team. In embodiments, the challenge requests are associated with time limits such that if either user for a game session 810A-D, 820A-B, or 830 is not able to join a game session to advance the tournament competition in a timely fashion, they may forfeit their game to the other user and fail to advance.

FIG. 9 illustrates flowchart 900 for monitoring chat communications between players during a game session. As was described above, a major problem for video gaming within a controlled environment is the monitoring of communications between users during a game session. Text or audio communications which are intended to allow users to communicate with each other for strategizing or friendly banter during a game session may be used instead to engage in illicit conversation or activities. In embodiments, the method illustrated by flowchart 900 may be performed by a video game server, such as video game server 200 of FIG. 2 or video game server 150 of FIG. 1.

In step 910, a game session is initiated. In embodiments, the video game server may initiate a game session between two or more users as described above relative to flowcharts 600 and 700 of FIGS. 6 and 7. In step 920, a chat session may be initiated during the game session so that users in the game session may communicate with each other. In an embodiment, communication between users may be audio conversation that is carried as VoIP data packets between the video game server and the electronic devices being used by the different users in the game session. A chat server within the video game server, such as chat server 240 of FIG. 2, may receive VoIP data packets from the users in the game session, mix and synchronize the audio data generated by the different users as described above relative to chat server 240 of FIG. 2, and transmit the mixed audio as VoIP data packets to the users in the game session. In another embodiment, the communication between users may be via text conversation that is carried by data packets between the video game server and the electronic devices being used by the different users in the game session. A chat server within the video game server, such as chat server 240 of FIG. 2, may receive the data packets of text conversation from the users in the game session, mix and synchronize the conversation data generated by the different users as described above relative to chat server 240 of FIG. 2, and transmit the text conversation as data packets to the users in the game session.

In step 922, the video game server begins monitoring the chat session to if any illicit activity may be occurring within the conversation. A security module within the video game server, such as security module 290 of FIG. 2, may monitor the packets received by the video game server during the game session. In embodiments, as was discussed above relative to security module 290 of FIG. 2, security module may monitor text data packets to see if key words or phrases are used that may signal some kind of illicit activity. In another embodiment, the security module uses speech recognition techniques to monitor audio decoded from audio packets, such as VoIP packets, for key words spoken by a user within the game session. In another embodiment, the security module uses speaker recognition techniques to inspect audio decoded from audio packets, such as VoIP packets, to determine if a particular user within the game session represents a voice that is not associated with the user, or if multiple voices are present within the audio packets received from a single user.

If, in step 925, an infraction is detected by the security module, a corrective action may take place in step 927. In embodiments, the corrective action taken may be the termination of the game session. In another embodiment, conversation between the users may be muted but the game session may be allowed to continue. In another embodiment, a verbal or visual warning may appear on the screens of the electronic devices of the users that an infraction has occurred. In another embodiment, the video game server may then report to a JMS, such as JMS 170 of FIG. 1, that an infraction has occurred. In another embodiment, the video game server may reduce the reputation rating of each user in the game session, such as reputation rating 406 of FIG. 4.

FIG. 10 illustrates system 1000 for video playback of a previously completed game session. System 1000 includes electronic devices 1002A and 1002B, LANs 1006A and 1006B, JMS 1008, and Video Game Server 1020. Video game server 320 may be an embodiment of video game server 200 of FIG. 2 or video game server 150 of FIG. 1. Electronic device 302 may be an embodiment of electronic devices 115A-D and 135A-D of FIG. 1. JMS 308 may be an embodiment of JMS 170 of FIG. 1.

FIG. 10 depicts a scenario in which one or more users of video game server 1020 wish to watch a video of a previously completed game session. In embodiments, users may be using electronic devices 1002A and 1002B to watch the video. In another embodiment, the users may watch video of a game session in progress via electronic devices 1002A and 1002B in a manner similar to a live sports event. In such a scenario, the users of electronic devices 1002A and 1002B may wish to chat with each other while watching the video of this live game session. In some embodiments, game data 1005A and 1005B may be stored on electronic devices 1002A and 1002B. In some embodiments, certain video games may require game data 1002A and 1002B to be stored locally on electronic device 1002A and 1002B for those devices to view the video successfully.

Video game server 1020 may receive a request to watch a video of a game session from a requesting user via electronic device 1002A and 1002B. A validation server on video game server, such as validation server 270 of FIG. 2, may determine if the user sending the request is permitted to watch the video. In an embodiment, if any user that played in the game session of the video being requested appears on the block list of the requesting user, such as block list 420 of FIG. 4, then the video game server may reject the request by the requesting user to watch the video. In an embodiment, when a live game session is being viewed by multiple users of video game server 1020, if any of the users already watching the video of the ligve game session are on the block list of the requesting user, such as block list 420 of FIG. 4, then the request may be denied and the requesting user may not be permitted to watch playback of the video. In another embodiment, if a user already watching the video of the live game session is on the block list of the requesting user, then video game server may permit the requesting user to watch the video while preventing any audio or text communication from being exchanged between the requesting user and the user on the requesting user's block list.

In embodiments, once the validation server has confirmed that a requesting user of electronic device 1002A or 1002B is permitted to watch the requested video, video game server 1020 may send video to the user of electronic device 1002A as video data packets 1012A and 1013A, and to the user of electronic device 1002B as video data packets 1012B and 1013B. Electronic device 1002A may take video data packets 1012A and 1013A and convert them to a video using existing standards such as the Moving Picture Experts Group 3 (MPEG3) standard. Likewise, electronic device 1002B may take video data packets 1012B and 1013B and convert them to a video using existing standards such as the Moving Picture Experts Group 3 (MPEG3) standard.

A chat server within video game server 1020, such as chat server 240 of FIG. 2, may handle any communications occurring between electronic devices 1002A and 1002B. To exchange conversation between users, audio data or text data may be sent from electronic device 1002A to video game server 1020 as VOIP data packets or regular data packets, such as packets 1016A and 1017A. Likewise, audio data or text data may be sent from electronic device 1002B to video game server 1020 as VOIP data packets or regular data packets, such as packets 1016B and 1017B. In an embodiment, the chat server within video game server 1020 may mix VOIP packets received from multiple users and output that audio as a VOIP packet, such as packet 1018A or packet 1018B, to electronic device 1002A and 1002B respectively. The chat server within video game server 1020 may also mix text data packets received from multiple users and output that text as packets 1018A and 1018B to electronic devices 1002A and 1002B, respectively. In embodiments, the chat server may mix the audio derived from communication data packets and form mixed audio communication data packets. In such cases, communication data packets sent to electronic devices 1002A and 1002B from video game server 1020, such as communication data packets 1018A and 1018B, may be mixed audio communication data packets reflecting the mixed audio of multiple users within the game session.

In order to monitor potential for illicit activity, security module 1024 within video game server 1020 may receive the audio packets, such as VoIP packets, or text data packets and monitor their contents for potential security concerns. In embodiments, security module 1024 receives packets 1016A, 1017A, 1016B, and 1017B. In embodiments, security module may monitor text data packets to see if key words or phrases are used that may signal some kind of illicit activity. In another embodiment, security module 1024 uses speech recognition techniques to monitor audio decoded from audio packets, such as VoIP packets, for key words spoken by a user within the game session. In another embodiment, security module 1024 uses speaker recognition techniques to inspect audio decoded from audio packets, such as VoIP packets, to determine if a particular user within the game session represents a voice that is not associated with the user, or if multiple voices are present within the audio packets received from a single user.

FIG. 11 illustrates flowchart 1100 for serving a video of a game session, according to embodiments. As was described relative to FIG. 10, a requesting user may request a video playback of a previously played game session from a video game server for entertainment purposes. The steps of flowchart 1100 may be executed by a video game server, such as video game server 1020 of FIG. 10, video game server 200 of FIG. 2, or video game server 150 of FIG. 1.

In step 1102, a video game server is accessed by a requesting user via an electronic device. The requesting user, via the electronic device, may provide a user handle, such as user handle 404 of FIG. 4, as well as a password or biometric input to the video game server to allow the user of electronic device to access the services of the video game server. Step 1102 may be handled specifically by a validation server within the video game server, such as validation server 270 of FIG. 2.

In step 1104, the requesting user may request a video of a game session from the video game server via the electronic device. In an embodiment, the video may be a video of a previously played and completed game session. In another embodiment, the video may be live streaming video of an ongoing game session.

In step 1110, the validation server within the video game server may determine if the requesting user is permitted to view the video. In embodiments, the validation server within the video game server may determine if any user that appears within the video of the game session—in other words, any user that was/is playing within the game session of the video being requested—appears on the block list of the requesting user, such as block list 404 of FIG. 4. In another embodiment, when a video of a live game session is being requested, the validation server may determine if the users already watching the live game session are on the block list of the requested user.

In step 1115, if any of the users within the video of the game session is on the requesting user's block list, then in step 1115 the request is determined to be disallowed. In an embodiment, a corrective action may be taken in step 1117 against the requesting user for making the video request. In step 1118, the request for the video may be rejected.

If, in step 1115, the request is determined to be allowable because no users either within the game session of the video being requested or, in the case of a live game session video, no users already viewing the video of the live game session are determined to be on the block list of the requesting user, the request may be accepted in step 1120. At this point, video game server may begin sending video as video packets to the electronic device of the requesting user.

In another embodiment, in step 1115, the request for a video of a live game session may still be allowed even if other users already watching the live game session are on the block list of the requested user. As was described above, the concern in this scenario is that spectators of the live game session may communicate with each other via audio or text chat, and some of those spectators may appear on the block lists of other spectators. In this scenario, audio or text chat may be disabled for the requesting user by the video game server. In another embodiment, audio and text chat may be allowed for the requesting user, but audio packets and text chat packets from a user on the requesting user's block list may simply be filtered such that no communication from the user on the requesting user's block list is allowed to reach the requesting user. Likewise, any audio and text chat packets from the requesting user may be filtered such that no communication from the requesting user is allowed to reach the user on the requesting user's block list.

It will be apparent to persons skilled in the relevant art(s) that various modules and features of the present disclosure, as described herein, can be implemented in hardware using analog and/or digital circuits, in software, through the execution of computer instructions by one or more general purpose or special-purpose processors, or as a combination of hardware and software.

Embodiments of the present disclosure can be implemented in hardware, or as a combination of software and hardware. Consequently, embodiments of the disclosure may be implemented in the environment of a computer system or other processing system. For example, video game server 200 depicted in FIG. 2 and its associated operational flows depicted in FIGS. 6, 7, 9, and 11 can be implemented in the environment of one or more computer systems or other processing systems. An example of such a computer system 1200 is shown in FIG. 12. One or more of the modules depicted in the previous figures, particularly the various modules of video game server 200 depicted in FIG. 2, can be at least partially implemented on one or more distinct computer systems 1200.

FIG. 12 illustrates an exemplary embodiment of computer system 1200 that can be used to implement the methods and apparatus of the present invention. Computer system 1200 includes one or more processors, such as processor 1204. Processor 1204 can be a special purpose or a general purpose digital signal processor. Processor 1204 is connected to a communication infrastructure 1206 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1200 also includes a main memory 1208, preferably random access memory (RAM), and may also include a secondary memory 1230. Secondary memory 1230 may include, for example, a hard disk drive 1212 and/or a removable storage drive 1214, representing a floppy disk drive, a magnetic tape drive, an optical disk drive, or the like. Removable storage drive 1214 reads from and/or writes to a removable storage unit 1218 in a well-known manner. Removable storage unit 1218 represents a floppy disk, magnetic tape, optical disk, or the like, which is read by and written to by removable storage drive 1214. As will be appreciated by persons skilled in the relevant art(s), removable storage unit 1218 includes a computer usable storage medium having stored therein computer software and/or data.

In alternative implementations, secondary memory 1230 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, a thumb drive and USB port, and other removable storage units 1222 and interfaces 1220 which allow software and data to be transferred from removable storage unit 1222 to computer system 1200.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a PCMCIA slot and card, etc. Software and data transferred via communications interface 1224 are in the form of signals which may be electronic, electromagnetic, optical, or other signals capable of being received by communications interface 1224. These signals are provided to communications interface 1224 via a communications path 1226. Communications path 1226 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1218 and 1222 or a hard disk installed in hard disk drive 1210. These computer program products are means for providing software to computer system 1200.

Computer programs (also called computer control logic) are stored in main memory 1208 and/or secondary memory 1230. Computer programs may also be received via communications interface 1224. Such computer programs, when executed, enable the computer system 1200 to implement the present disclosure as discussed herein. In particular, the computer programs, when executed, enable processor 1204 to implement the processes of the present disclosure, such as any of the methods described herein. Accordingly, such computer programs represent controllers of the computer system 1200. Where the disclosure is implemented using software, the software may be stored in a computer program product and loaded into computer system 1200 using removable storage drive 1214, interface 1220, or communications interface 1224.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

What is claimed is:

1. A system for monitoring video game activity within a controlled environment facility, comprising:
    a user database that stores a user profile having a blacklist, the blacklist being a list of individuals with which the user is prohibited from communicating, and the blacklist being generated based on information relating to the user stored in a controlled environment facility database; and
    a game server configured to establish a game session between the user and a second player, the game server comprising one or more processors configured to:
        receive in-game communications between the user and the second player;
        review the in-game communications for prohibited content, the review including:
            performing voice recognition to detect that a plurality of different speakers are participating in the in-game communications;
            identifying each of the plurality of speakers based on the voice recognition;
            comparing the identities of each of the plurality of speakers to the blacklist associated with the user;
            determining, based on the comparing, whether any of the plurality of speakers are prohibited from communicating with the user; and
        routing or blocking the in-game communications based on the review.

2. The system of claim 1, wherein the one or more processors of the game server are further configured to:
  receive an identity of the second player;
  determine whether the second player is included in the blacklist; and
  establish or deny the game session based on the determining.

3. The system of claim 1, wherein the in-game communications are text-based, and wherein the review includes analyzing the in-game communications for prohibited keywords.

4. The system of claim 1, wherein the in-game communications are voice-based.

5. The system of claim 4, wherein the review includes:
  performing speech recognition on the in-game communications;
  converting the in-game communications to text; and
  reviewing the converted in-game communications for prohibited keywords.

6. The system of claim 1, wherein the one or more processors of the game server are further configured to take remedial action in response to detecting prohibited content.

7. The system of claim 6, wherein the remedial action includes terminating the video game session.

8. A game server for providing a gaming session between an inmate of a controlled environment facility and a second player, comprising:
  an inmate database that stores an inmate profile having a blacklist, the blacklist being a list of individuals with which the inmate is prohibited from communicating, and the blacklist being generated based on information relating to the inmate stored in the inmate database; and
  one or more processors configured to:
    establish a game session between the inmate and the second player;
    receive in-game communications between the inmate and the second player;
    review the in-game communications for prohibited content, the review including:
      performing voice recognition to detect that the in-game communications include a plurality of speakers;
      identifying each of the plurality of speakers based on the voice recognition;
      comparing the identities of each of the plurality of speakers to the blacklist associated with the inmate;
      determining, based on the comparing, whether any of the plurality of speakers are prohibited from communicating with the user; and
      routing or blocking the in-game communications based on the review.

9. The game server of claim 8, wherein the one or more processors are further configured to:
  receive an identity of the second player;
  determine whether the second player is included in the blacklist; and
  establish or deny the game session based on the determining.

10. The game server of claim 8, wherein the in-game communications are text-based, and wherein the review includes analyzing the in-game communications for prohibited keywords.

11. The game server of claim 8, wherein the in-game communications are voice-based.

12. The game server of claim 11, wherein the review includes:
  performing speech recognition on the in-game communications;
  converting the in-game communications to text; and
  reviewing the converted in-game communications for prohibited keywords.

13. The game server of claim 8, wherein the one or more processors are further configured to take remedial action in response to detecting prohibited content.

14. The game server of claim 13, wherein the remedial action includes terminating the video game session.

15. A method for providing a video game session between an inmate of a controlled environment and a second player, comprising:
  storing, in a user database, a blacklist associated with the inmate, the blacklist being a list of individuals with which the inmate is prohibited from communicating, and the blacklist being generated based on information relating to the user stored in a controlled environment facility database;
  establishing, by a game server, a game session between the inmate and the second player;
  receiving, by the game server, in-game communications between the user and the second player;
  reviewing, by the game server, the in-game communications for prohibited content, the reviewing including:
    performing voice recognition to detect that a plurality of different speakers are participating in the in-game communications;
    identifying each of the plurality of speakers based on the voice recognition;
    comparing the identities of each of the plurality of speakers to the blacklist associated with the user;
    determining, based on the comparing, whether any of the plurality of speakers are prohibited from communicating with the user; and
    routing or blocking, by the game server, the in-game communications based on the review.

16. The method of claim 15, further comprising:
  receiving, by the game server, an identity of the second player;
  determining, by the game server, whether the second player is included in the blacklist; and
  establishing or denying, by the game server, the game session based on the determining.

17. The method of claim 15, wherein the in-game communications are text-based, the method further comprising analyzing the in-game communications for prohibited keywords.

18. The method of claim 15, wherein the in-game communications are voice-based.

19. The method of claim 18, wherein the reviewing includes:
  performing, by the game server, speech recognition on the in-game communications;
  converting, by the game server, the in-game communications to text; and
  reviewing, by the game server, the converted in-game communications for prohibited keywords.

20. The method of claim 15, further comprising taking remedial action, by the game server, in response to detecting prohibited content.

* * * * *